United States Patent [19]

Rampe

[11] Patent Number: 5,069,654

[45] Date of Patent: Dec. 3, 1991

[54] SYSTEM FOR DRIVINGLY CONNECTING GEARS, PULLEYS, WHEELS, ROLLERS AND OTHER APERTURED COMPONENTS TO SHAFTS

[75] Inventor: John F. Rampe, Bratenahl, Ohio

[73] Assignee: Jepmar Research, Fairport Harbor, Ohio

[21] Appl. No.: 621,079

[22] Filed: Nov. 30, 1990

[51] Int. Cl.⁵ ............................................. F16H 55/00
[52] U.S. Cl. ..................................... 474/161; 29/892; 403/376; 474/94
[58] Field of Search ................. 474/161, 94, 190–192, 474/902, 903; 29/159 R, 159.2, 159.3, 892; 403/376–378

[56] References Cited

U.S. PATENT DOCUMENTS

| | | |
|---|---|---|
| 458,580 | 9/1891 | Irvin . |
| 631,957 | 8/1899 | Diescher . |
| 784,762 | 3/1905 | Shepard . |
| 836,706 | 11/1906 | Richards . |
| 1,118,457 | 11/1914 | Windisch . |
| 1,919,375 | 7/1933 | Maclachlan et al. . |
| 2,177,924 | 10/1939 | Buckwalter ........................... 287/52 |
| 2,391,302 | 12/1945 | Evans ................................ 287/52.03 |
| 2,437,305 | 3/1948 | Nickle ............................... 287/52.08 |
| 2,444,922 | 7/1948 | Deetman ........................... 287/52.05 |
| 3,010,333 | 11/1961 | Rampe ............................... 74/230.17 |
| 3,047,318 | 7/1962 | Berkshire ......................... 287/52.08 |
| 3,076,352 | 2/1963 | Larsh ..................................... 74/443 |
| 3,168,338 | 2/1965 | Spieth .................................... 287/52 |
| 3,200,665 | 8/1965 | Wells ...................................... 74/446 |
| 3,225,616 | 12/1965 | Whitehead ............................. 74/449 |
| 3,257,860 | 6/1966 | Runde et al. .................... 474/161 X |
| 3,272,027 | 9/1966 | Wyman ................................. 74/243 |
| 3,361,004 | 1/1968 | Williams et al. ...................... 74/434 |
| 3,612,582 | 10/1971 | Pitmer ............................... 287/52.05 |
| 3,666,322 | 5/1972 | Pickron ............................ 474/161 X |
| 3,696,685 | 10/1972 | Lampredi ............................ 474/161 |
| 3,830,577 | 8/1974 | Rampe et al. ....................... 403/378 |
| 3,871,690 | 3/1975 | Wright et al. ....................... 285/226 |
| 3,995,967 | 12/1976 | Haller ................................. 403/370 |
| 4,143,973 | 3/1979 | Hauser ................................... 366/54 |
| 4,217,944 | 8/1980 | Pascal ................................. 152/323 |
| 4,722,722 | 2/1988 | Rampe ................................ 474/161 |
| 4,946,427 | 8/1990 | Rampe ................................ 474/161 |

FOREIGN PATENT DOCUMENTS 57-94168  6/1982  Japan .

OTHER PUBLICATIONS

"15 Ways to Fasten Gears to Shafts", *Product Engineering*, May 30, 1960 pp. 43–47.

Primary Examiner—Thuy M. Bui
Attorney, Agent, or Firm—David A. Burge

[57] ABSTRACT

A connection system is provided for mounting apertured components such as gears, pulleys, rollers and the like on shafts. In preferred form, the system of the invention provides connections that are releasable so that shaft-mounted components can be repositioned, removed, serviced and/or replaced. A component that is to be mounted on a shaft is provided with a mounting hole that has an inner diameter that loosely receives the outer diameter of a shaft onto which the component is to be mounted. A ring of elastomeric material is inserted into an annular space that is defined at a location between the inner diameter of the mounting hole and the outer diameter of the shaft; and, the elastomeric material is tightly clamped between a pair of relatively axially movable clamping members that extend into opposed end regions of the annular space. Typically, the clamped elastomeric material includes one or a combination of sleeve-like and/or O-ring-like members that are so tightly clamped toward each other as to be "hydro-elastomerically" compressed between the clamping members. In one embodiment, the elastomeric material directly engages both the inner diameter of the mounting hole and the outer diameter of the shaft. In another embodiment, a thin-walled sleeve assists in filling such space as exists between the inner diameter of the mounting hole and outer diameter of the shaft. In preferred form, the sleeve has an internal diameter that closely surrounds the outer diameter of the shaft, and has an external diameter that cooperates with the inner diameter of the mounting hole to define the annular space.

110 Claims, 6 Drawing Sheets

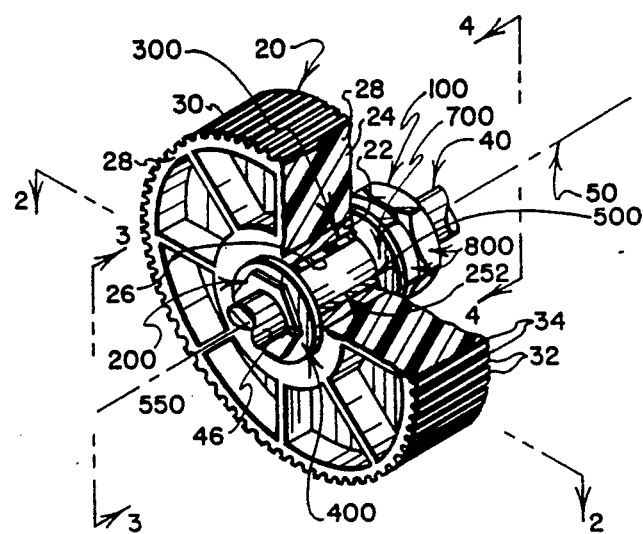
FIG. 1
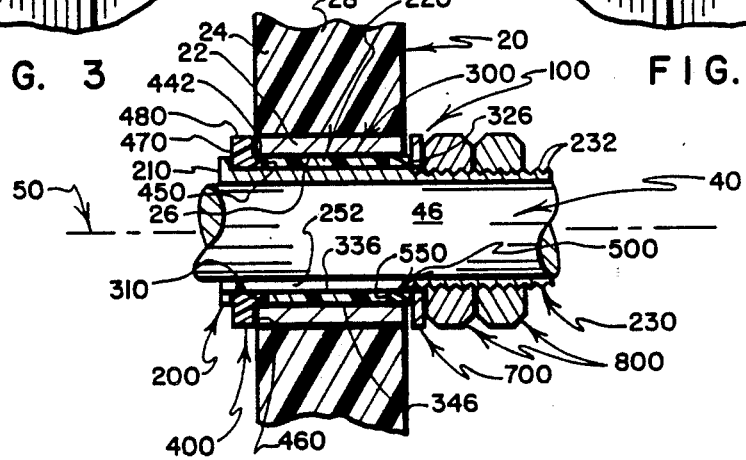
FIG. 3
FIG. 4
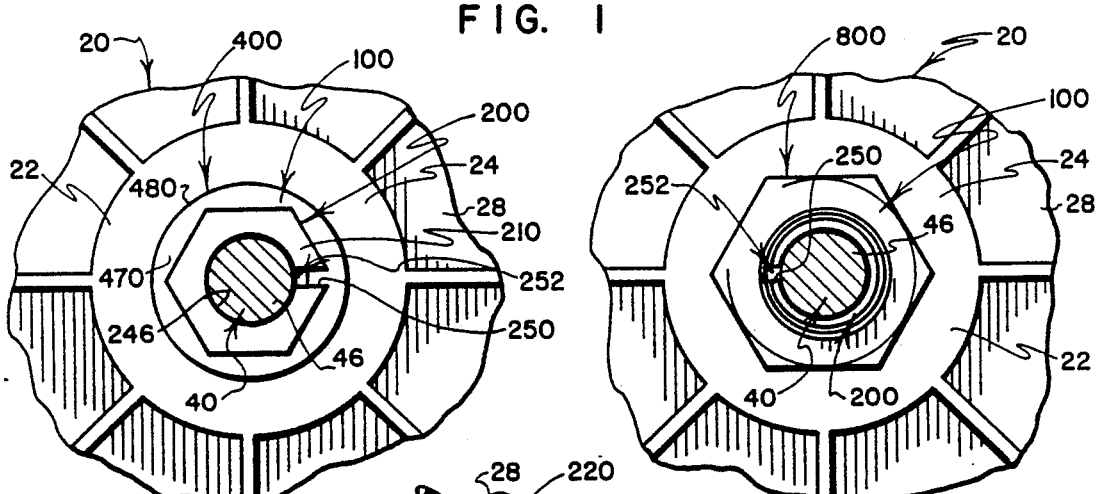
FIG. 2

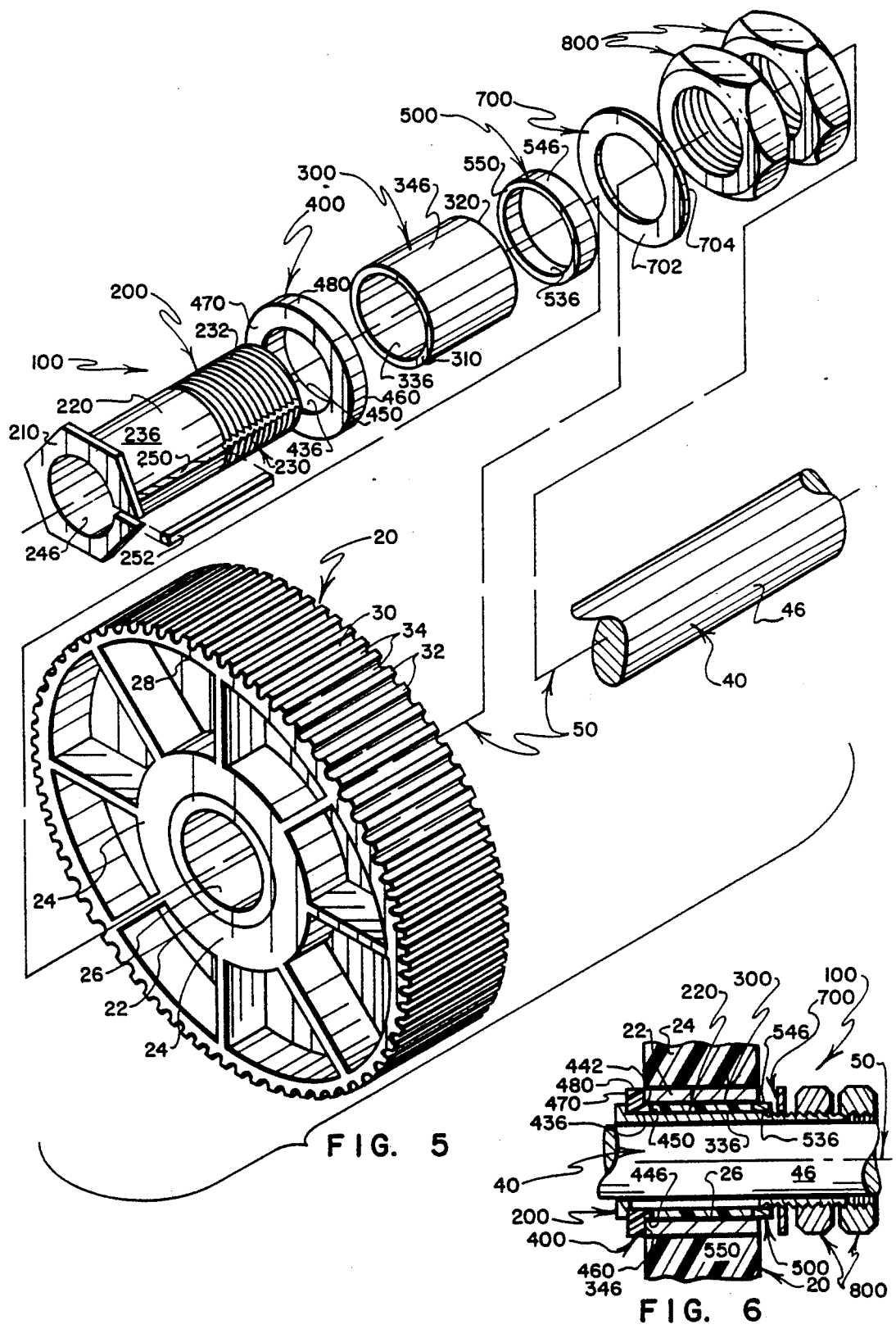

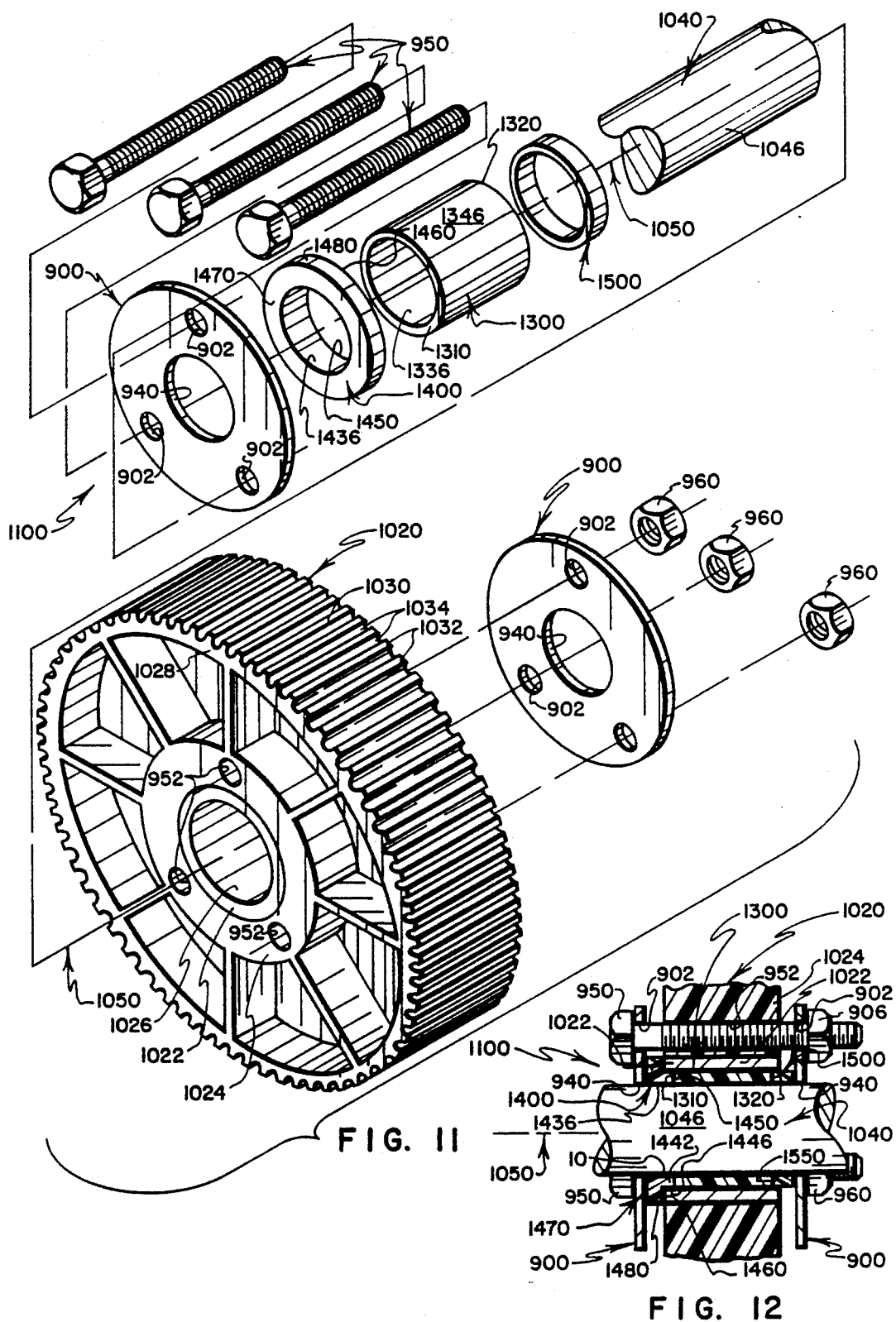

SYSTEM FOR DRIVINGLY CONNECTING GEARS, PULLEYS, WHEELS, ROLLERS AND OTHER APERTURED COMPONENTS TO SHAFTS

BACKGROUND OF THE INVENTION

1. Field of the Invention

The present invention relates to a highly versatile system for providing desired types of connections between first and second components or parts of a mechanism or machine, wherein a hole or other form of "aperture" is formed through the first component, wherein a portion of the second component projects relatively loosely through the aperture, wherein elastomeric material extends perimetrically about the second component to substantially "fill" a confined, ring-like space that is defined within the aperture of the first component, and wherein the elastomeric material is securely clamped and compressed within the confined, ring-like space to provide a desired type of connection between the first and second components, namely a connection that permits very little, if any, relative movement to take place between the connected components.

A more particular need that is addressed by the preferred practice of the present invention relates to the provision of a novel and improved method and means for securely connecting apertured components and elongate rods or shafts— i.e., a system for providing connections that are sufficiently reliable for use in mounting components as such as gears, pulleys, rollers and the like on shafts. In preferred practice, the present invention relates to a method and means for clamping elastomeric material in a confined annular space that is provided between the inner diameter of a bore or mounting hole that is formed through a component such as a gear or a pulley, and the outer diameter of a shaft that extends loosely through the bore— with the clamped elastomeric material typically including one or a combination of sleeve-like and/or O-ring-like members that are "hydro-elastomerically" compressed within the confined annular space so as to assist in providing a highly reliable driving connection between the shaft and the shaft-mounted component.

2. Prior Art

Pulleys, gears and other components that are "apertured" (meaning that they are provided with "bores" or "mounting holes" that extend through the components to define passages that are intended to receive elongate support members such as shafts, rods and the like) are well known and take a variety of forms. Typically, such pulleys, gears and other components are formed from rigid materials such as metal or plastic, or from combinations of metal and plastic.

The subject of forming apertured components such as gears, pulleys and the like from combinations of rigid materials as by utilizing metal "inserts" that have portions that are at least partially encompassed by or embedded within in plastics materials has been addressed by prior proposals. For example, this subject is addressed by the inventions of U.S. Pat. No. 4,722,722 and 4,946,427 issued Feb. 2, 1988 and Aug. 7, 1990, respectively, to John F. Rampe (referred to hereinafter as the "Referenced Pulley Patents," the disclosures of which patents are incorporated herein by reference). In accordance with the preferred practice of the inventions of the Referenced Pulley Patents, a component that is to be mounted on a "shaft (typically a gear or a pulley) is formed by molding plastics material in situ about perimetrically extending portions of a metal "insert." The "insert" defines at least a portion of a "hub" formation that has a bore extending centrally therethrough to provide a passage that is suited to receive a shaft onto which the component will be mounted and drivingly connected so as to be movable with the shaft.

In a typical application wherein an apertured component (e.g., a pulley of the type that is formed in accordance with the Referenced Pulley Patents) is to be mounted on a shaft, the inner diameter of the bore of the component typically closely receives the outer diameter of the shaft onto which the component is to be mounted. In conventional practice, the bore receives the shaft in a slip fit so that no significant amount of ring-like space is provided between the inner diameter of the bore of the component and the outer diameter of the shaft (i.e., the component does not "loosely" receive the shaft onto which the component is to be mounted). To complete the connection of the component to the shaft, one or more commercially available fasteners (such as set screws that are threaded through appropriately configured holes, drive pins that extend through appropriately configured holes, keys that extend in appropriately configured keyways, or the like) are used to hold the component in position on the shaft such that a secure driving connection is provided between the shaft and the shaft-mounted component that prevents relative rotation therebetween when torque forces need to be transmitted between the shaft and the shaft-mounted component.

The use of keys positioned in keyways, and of splined-type connections to couple components such as pulleys and gears to shafts tends to be expensive in that it normally requires precise machining so that suitably configured keyways or mating spline formations are provided both on the shaft and on the component that is to be mounted on the shaft. If a semi-circular shaped keyway is provided on the shaft to receive what is known in the art as a Woodruff key, or if a groove-like keyway of limited length is machined on the shaft, any needed axial repositioning of a rotary drive component relative to the shaft may require the machining of an alternately located key-way, or the machining of an extension of an existing key-way or spline formation— which often means that the shaft must be removed and/or replaced with a properly reconfigured shaft. Thus, in many applications the use of these types of connection systems limits the extent to which shaft-mounted components can be positioned or repositioned axially along a shaft.

Moreover, while the use of keys positioned in keyways or the use of mating spline formations may provide effective ways in which to address the need for preventing relative rotation between shaft-mounted components and the shafts on which the components are mounted, the provision of keys in keyways or of mating spline formations does not address the very real companion need to prevent relative axial movement of shaft-mounted components and the shafts on which the components are mounted. Prevention of relative axial movement typically is addressed in conventional practice as by using set screws, pins, cotter pins or the like that are positioned in suitable holes formed in the components and/or in their mounting shafts, or by using other types of commercially available fasteners such as snap rings that are positioned in grooves that are machined in the shafts—with many of these connection techniques also serving to limit the extent to which the positions of components easily can be adjusted axially along the shafts on which the components are mounted.

One relatively non-conventional approach that has been utilized with success to mount rotatable components such as gears and pulleys at desired positions extending axially along shafts is addressed by U.S. Pat. No. 3,830,577 issued Aug. 20, 1974 to John F. Rampe et al (referred to hereinafter as the "Referenced Pulley Mounting Patent," the disclosure of which is incorporated herein by reference). The unique approach that is taken in accordance with the preferred practice of the invention of the Referenced Pulley Mounting Patent involves a plural step procedure that, in a simple way, addresses not only 1) the problem of preventing relative rotary movement between a component (typically a gear or a pulley) and the shaft on which the component is mounted, but also 2) the problem of preventing relative axial movement between a component and the shaft on which it is mounted, and 3) the need to provide a ready capability to selectively position and reposition a component axially along a shaft on which the component is mounted.

In accordance with one form of preferred practice of the invention of the Referenced Pulley Mounting Patent, the component that is to be mounted on a shaft is provided with a generally cylindrical hub formation, with the hub formation having an inner diameter that closely receives the outer diameter of the shaft (typically in a slip fit), and with the hub formation having an outer diameter that extends substantially concentrically about the inner diameter. A substantially radially extending hole is formed through the hub, with the inner end of the hole opening through the inner diameter, and with the outer end of the hole opening through the outer diameter. A pointed pin, typically formed from hardened steel, is inserted into the hole, with the pin having its pointed end projecting inwardly for engaging the outer diameter of a shaft on which the component has been positioned, and with the pin having a relatively flat (i.e., non-pointed) outer end that extends radially outwardly beyond the outer diameter of the hub. An endless clamping band is loosely installed about the outer diameter of the hub, with the band not only surrounding the outer diameter of the hub but also encompassing and engaging the outer end of the pin. The clamping band is progressively clamped so as to diminish the diameter of the area that it surrounds, with this clamping preferably being effected as by crimping portions of the band toward each other at a location that preferably is on the opposite side of the hub from where the outer end of the pin projects through the outer diameter surface of the hub. As the clamping of the band continues, the band eventually is brought into firm clamping engagement with the outer diameter surface of the hub formation. This progressive clamping of the band serves to drive the pointed pin radially inwardly such that its pointed inner end penetrates the material of the shaft to establish a secure "pinned" type of driving connection between the rotatable component and the shaft on which the component is mounted.

The character of the "pinned" type of connection that results from the use of the preferred practice of the invention of the Referenced Pulley Mounting Patent tends to prevents both radial and axial movement of the component relative to its mounting shaft. Moreover, the component initially can be positioned at substantially any desired location along its mounting shaft; and, if axial repositioning is desired, the clamping band and the pointed pin either can be loosened or removed and/or replaced to permit repositioning to be effected.

The use of set screws, pinned type connections, and many other previously proposed forms of couplings that typically utilize a variety of commercially available fasteners to securely connect rotary components such as gears and pulleys to shafts often tend to cause stress concentrations to develop, with the result being that, in many instances longevity of service of the resulting component-to-shaft connections is diminished due to such factors as "fatigue" and/or stress-induced breakage.

A difficulty that often must be dealt with in providing component-to-shaft connections is that of maintaining concentricity (i.e., of assuring that the center axis of a shaft-mounted component extends coaxially with respect to the center axis of the shaft on which the component is mounted). The use of set screws and other conventional fastening devices often tends to hinder the attainment of this objective. For example, as a set screw is tightened in a threaded, radially extending hole that is formed in a hub portion of a pulley so as to bring the inner end of the set screw forcefully into engagement with one side of the outer diameter of a shaft on which the pulley is positioned, the tightening of the set screw into secure engagement with the shaft tends to move the pulley (and hence its center axis) to one side of the center axis of the shaft and/or to skew the center axis of the pulley relative to the center axis of the shaft—whereby the objective of maintaining concentricity is defeated.

The principal way in which the difficulty of maintaining concentricity of shafts and shaft-mounted components has been addressed in the prior art is to assure that a snug, precision fit is achieved as a shaft-mounted component is brought into a desired position along a shaft on which the component is to be mounted. Typically, this has called for at least some machining to be done on one or both of the component and its mounting shaft, with the result that the forming of component-to-shaft connections that are quite precisely concentric has typically been a costly objective to achieve.

Turning to a different but related subject, there exists in the art an increasing need for a capability to "resiliently connect" some components of mechanisms or machines, and to "cushion mount" rotary drive components such as gears and pulleys on shafts, with the resilient nature of the resulting mountings providing connections that are essentially "rigid" except that, to a very limited extent, provision is made for minor relative movements of the connected components. For example, as efforts increasingly are being made to reduce the noise that is made by office machines such as impact printers, efforts are being made to "resiliently connect" and/or to "cushion mount" some otherwise rigidly connected components—with the objective in mind of diminishing the transmission of objectionable noise between components that are, in essence, rigidly connected. By way of another example, in some mechanical equipment such as impact printers, it has been found that shock absorbing mountings of certain components can prevent the transmission of unwanted vibration-causing forces between components that are, in essence, rigidly connected—whereby longevity of service life of the equipment may be significantly enhanced, and objectionable noise that otherwise would be generated by the equipment tends to be damped. However, prior pulley-to-shaft connection system proposals and the like have not tended to adequately address these needs and/or have provided unduly complex and expensive-to-implement proposals that have left open the need for improved proposals exhibiting good performance at relatively low cost.

In conjunction with shafts and rods that move relative to surrounding components (i.e., shafts and rods that are not rigidly connected to their surrounding components—for example, in applications involving piston rods that project from and move axially with respect to housings that surround portions of the piston rods), it is well known to use resilient sleeve-like or ring-like members formed from elastomeric materials to provide "seals." Examples of such sealing devices are provided by what has become well known to those who are skilled in the art as "O-rings." In some instances, such seals prevent the escape of fluid such as hydraulic fluid or compressed air, or the entry of ambient water vapor or sea water. In other instances, the seals serve to retain lubricant within selected regions that extend axially along shafts, piston rods and other elongate members that move relative to surrounding supporting structures. In still other instances, the seals minimize the entry of contaminants such as dust, metal filings, chemical vapors and the like into selected regions that extend axially along shafts and piston rods.

However, to the extent that prior proposals have utilized ring-like and/or sleeve-like formations of elastomeric material extending about shafts, piston rods and the like, the elastomeric material has not been so "compressed" as to positively prevent significant relative movement from taking place between shafts or piston rods and such supporting and/or surrounding structures as may extend circumferentially about the shafts and piston rods. To the contrary, in accordance with prior proposals, sleeve-like and/or ring-like formations of elastomeric materials typically have been used more to "promote" than to "hinder" relative movement from taking place between shafts or rods and such structures as extend circumferentially about the shafts or rods.

Thus, while conventional practice has made use of sleeve-like and/or ring-like members 1) that are formed from elastomeric materials, 2) that are positioned to extend circumferentially about portions of shafts or rods, and 3) that are interposed between shaft or rod portions and rigid structures that extend circumferentially about such shaft or rod portions, it is quite appropriate to observe that the uses that have been made of such elastomeric members have judiciously "provided for" and "permitted" (indeed, often "facilitated") the capability of the shafts or rods to move rotatably and/or axially relative to surrounding structures. It therefore "flies in the face" of conventional practice to deploy sleeve-like and/or ring-like members 1) that are formed from elastomeric materials, 2) that are positioned to extend circumferentially about portions of shafts or rods, and 3) that are interposed between shaft or rod portions and rigid structures that extend circumferentially about such shaft or rod portions, with the purpose in mind to use the elastomeric members to "prevent" (i.e., to "foreclose" the capability of) the shafts or rods from moving rotatably and/or axially relative to the surrounding structures.

Moreover, prior proposals have not taught or suggested the use of a "hydro-elastomeric" approach (i.e., an approach wherein elastomeric material is subjected to such extensive compression force as to bring out substantially "fluid-like" behavior characteristics that are used to advantage, while enabling the elastomer to retain many of its "solid-form" behavior characteristics that also are used to advantage) to address the problem of providing secure connections between mechanical components such as shafts and shaft-mountable components such as gears, pulleys, rollers, wheels and the like. Nor have prior proposals pointed to the highly advantageous use that can be made of a "hydro-elastomeric" approach to address the very real need that exists in the art for a versatile connection system that can be used to form secure connections that are, in essence, "tailored" to exhibit characteristics that are chosen from a wide range of available design characteristics—examples being connections that range from "substantially rigid" (i.e., connections that permit little if any relative movement between components that they couple) to connections that can be thought of as being relatively "resilient" or "cushioned" in character (i.e., connections that do permit, to a limited extent, relative movement between connected components, and that often can be deployed advantageously to damp vibration, to absorb shock and/or to diminish noise transmission).

In summary, while the prior art is replete with proposals for connecting components of mechanisms and machines, prior proposals have not recognized that significant advantages can be achieved by utilizing a "hydroelastomeric" approach to simultaneously address such needs as 1) needs for preventing or permitting, to desired degrees, selected types of relative movements between connected components; 2) needs for providing or permitting a capability to selectively position and reposition components that are to be connected; 3) needs for preventing the buildup of undesirable stress concentrations as the result of providing component connections; and 4) needs for providing connections that can be designed to select from a wide range of available "connection behavior characteristics" that includes not only a capability to limit relative movement between connected components but also to provide shock absorbing, noise abating and/or vibration damping mounts that are "tailored" to conform to needs of particular applications, to enhance longevity of service and improve overall performance.

SUMMARY OF THE INVENTION

The present invention addresses the foregoing and other drawbacks by providing a novel and improved, highly versatile system for forming desired types of connections between components of mechanisms and machines.

In accordance with one aspect of the preferred practice of the present invention, first and second components or parts of a mechanism or machine are connected as by providing a hole or other form of "aperture" that extends through the first component, by providing a portion of the second component that projects relatively loosely through the aperture, by providing elastomeric material that extends perimetrically about the second component to substantially "fill" a confined, ring-like space that is defined within the aperture of the first component, and by securely clamping the elastomeric material so as to compress the elastomeric material within the confined, ring-like space to provide a desired type of connection between the first and second components.

In accordance with another aspect of the preferred practice of the present invention, 1) one or more ring-like and/or sleeve-like solid-form members that are formed from elastomeric material (defining what will be referred to as a "quantity of solid-form elastomeric material") is/are interposed between a first component and a second component at a location where the first component surrounds the second component (with the quantity of elastomeric material being deployed in something of a ring-like or a sleeve-like space that is defined between the "surrounding" first component and the "surrounded" second component); 2) the quantity of elastomeric material is "clamped" so as to cause the elastomer to substantially "fill" what will be referred to as its "confinement space" (i.e., a space that is defined by surfaces that surround the elastomer, with such space occupying at least a portion of the aforedescribed "ring-like" or "sleeve-like" space that is defined between the first and second components); 3) the quantity of elastomeric material is "compressed" so as to diminish the volume that it occupies (i.e., by diminishing the volume of the "confinement space"—and hence the volume of the elastomer that substantially "fills" the "confinement space"), and to thereby cause the quantity of elastomeric material to become "pressurized" so that (much in the manner of a compressed fluid) the confined, compressed, pressurized elastomer is caused to exert pressure forces on such surfaces as define its "confinement space;" 4) whereby "fluid-like" characteristics of the compressed elastomer are used to advantage in the sense that pressure forces that are exerted at elastomer/component interfaces (i.e., at interfaces that extend between the compressed elastomer and the first and second components) tend to assist in providing secure connections at such interfaces (e.g., to inhibit "slippage" between interface-engaging portions of the elastomer and interface-defining surfaces of the components that are engaged by the elastomer); and, 5) whereby "solid-form" characteristics of the elastomer are used to advantage in the sense that the natural resistance that the elastomer has to shear force is used to enable forces (e.g., torque forces) to be transmitted through the material of the elastomer from one of the connected components to the other, so that a secure connection is provided between the first and second components.

Stated in another way, a feature of the preferred practice of the present invention resides 1) in the use that it makes of compressing a quantity of elastomeric material that is confined between first and second components so as to bring out and to take advantage of essentially fluid-form characteristics of the elastomer (e.g., in the sense that the capability of the elastomer to develop multidirectional pressure forces in response to the elastomer's being "compressed"), and 2) in the use that it makes of solid-form characteristics of the elastomer (e.g., in the senses that: i] during assembly, the ring-like and/or sleeve like element or elements that make up the "quantity of solid-form elastomeric material" readily can be grasped by hand or manipulated by machine to facilitate assembly with other components; ii] during the time when the elastomer serves to provide a "connection medium" between first and second components, advantage is taken of the natural tendency of the elastomer to resist shear forces whereby, unlike a liquid that will "flow" if subjected to shear, the material of the elastomer can be used to transmit such forces as torque from one to the other of a pair of components between which the elastomer has been compressed; and, iii] in the sense that, if need be, the essentially "frictional" connections that are formed between elastomer/component interfaces can be "enhanced" or "supplemented" as by "roughening" component surfaces and/or by utilizing adhesive to assist in preventing unwanted "slippage" from occurring between elastomer-to-component connected surfaces). Thus, in preferred practice, the present invention provides a novel and improved "hybrid" type of connection that utilizes favorable characteristics of the elastomer's ability to behave partially as a "fluid" and partially as a "solid."

Still another feature that obtains with the preferred practice of the present invention resides in the versatile capability that is provided to form a "tailored" sort of connection between a pair of components (e.g., a connection i) that is characterized by a desired degree of "rigidity;" ii) that is characterized by a desired degree of "shock absorbing," "vibration absorbing" and/or "noise abating" capability; iii) that will permit selected types and/or selected ranges of relative movement to take place between connected components but that also may severely restrict, or even prevent, other types of relative movement; and/or that is characterized by any of a wide variety of other desired forms of "connection behavior."

If the system of the present invention is used to drivingly connect an apertured component such as a pulley or gear to a shaft, an important feature of the preferred practice is that the system of the present invention can be used not only to assist in forming a "secure" connection, but also that it can be used to assist in maintaining connection concentricity. For example, i) if the pulley or gear has a center bore that defines an inner diameter surface that extends quite precisely along a center axis about which it is desired to mount the pulley or gear for rotation; ii) if a shaft portion to which such a component is to be mounted has an outer diameter surface that extends quite precisely along a center axis about which the shaft will be rotated, and iii) if the elastomeric member or members that form(s) the ring-like and/or sleeve-like "quantity of elastomeric material" that is to be interposed between the inner and outer diameter surfaces is of substantially uniform composition and radially extending thickness; when the elastomer is compressed and pressurized within an annular space that is defined between the inner and outer diameter surfaces, the pressure forces that are generated within the elastomer will aid in providing and maintaining concentricity (i.e., the elastomer will help maintain the center axis of the pulley or gear so that it extends coaxially along the center axis of the shaft). Stated in another way, despite the use by the connection of the connection system of the present invention of component surfaces that fit quite loosely one within the other, the connection system can be utilized to provide and maintain connection concentricity; and, as the connection system is "tightened into place," it tends to generate forces of increasing magnitude that can be used to increasingly promote connection concentricity. Utilizing loose-fitting components to provide good connection concentricity clearly "flies in the face" of prior proposals which have conventionally called for components to be machined to fit snugly together to provide good connection concentricity.

Still another feature of preferred practice resides in the rather remarkable capacity of the system of the present invention to provide the above-described and other forms of versatility through the extremely simple medium of providing a small "kit" of connection-forming parts that are relatively simple and inexpensive to form, easy to assemble and simple to deploy so that a pair of suitably configured components can be connected quickly, easily and inexpensively without a need for close tolerance keyways, spline formations or the like be machined on one or both of the components.

As will be apparent to those who are skilled in the art, there are many ways in which the system of the present invention can be "tailored" to provide desirable "connection behavior" characteristics. By way of but a few examples, ranges of permitted relative movement between connected components can be controlled i) by controlling the "resiliency" of the elastomer that is compressed between the first and second components; ii) by controlling the radially measured thickness of the "quantity of elastomeric material" that is positioned in a substantially annular space that is defined between the first and second components; and/or iii) by controlling the axially measured length of the "quantity of elastomeric material" that is interposed between a pair of coaxially extending but radially spaced component surfaces. Using these techniques, connections can be formed that exhibit relatively "rigid" connection behavior (i.e., that tends to permit a very limited range of relative movement to take place between connected components). Likewise, connections can be formed that are relatively "resilient" (i.e., that provide "cushioned" couplings between connected components, and/or that tend to permit relatively wide ranges of relative movement between connected components).

Another way in which "connection behavior" can be controlled in accordance with the preferred practice of the present invention has to do with the design of the components that provide what will be referred to as a "clamping device" that is employed to provide requisite clamping, compression and pressurization of the elastomer. Depending on whether the "clamping device" extends into engagement with and/or is connected to one or both of a pair of connected components, and depending on the character of such engagement and/or connection, desired types of limitations can be put on the range(s) of relative movement(s) that can take place between a pair of connected components. For example (and as will be explained in greater detail later herein), relative radial and relative axial movement of the connected components can be substantially eliminated while, at the same time, a nicely "cushioned" type of driving connection is provided that permits relative angular movement to take place between connected components within a controlled, preselected range of movement.

While in the preferred practice of the present invention, clamped, compressed, pressurized elastomer connections are formed as by utilizing a small "kit" of parts that are assemblable to permit selective-position mounting of an appropriately configured "apertured component" on an appropriately configured "elongate component," those who are skilled in the art will understand that features of the present invention are not limited in their usefulness to providing and/or deploying parts from "kits," or to the forming of "mounting" types of connections (i.e., wherein one component is caused to be "mounted" on another), or to the provision of "concentric" types of component connections (i.e., wherein substantially cylindrical inner and outer diameter surfaces that loosely interfit are caused to be connected by "clamped" resilient materials that normally are of sleeve-like or ring-like shape). While "annular" or "ring-like" or "sleeve-like" parts and/or portions thereof are discussed in conjunction with the "best mode" examples that are described and illustrated in this document, those who are skilled in the art will understand that features of the present invention can be utilized in conjunction with components and component portions that differ in configuration from those that are discussed, described and/or illustrated herein, whereby it will be understood that both method and product features of the system of the present invention are usable in a relatively broad range of environments to address a relatively broad range of needs for forming a relatively broad range of types of connections between and/or among a wide variety of components.

BRIEF DESCRIPTION OF THE DRAWINGS

These and other features, and a fuller understanding of the invention may be had by referring to the following description and claims, taken in conjunction with the accompanying drawings, wherein:

FIG. 1 is a perspective view showing portions of one side of a rotary component connected to a shaft component by employing one preferred embodiment of a connection system that incorporates features of the present invention, with opposed end portions of the shaft that project away from the rotary component being broken away, and with portions of the rotary component being broken away to permit connection system parts that are deployed within a central bore of the rotary component to be seen;

FIG. 2 is a sectional view, on an enlarged scale, as seen from a plane that is indicated by a line 2—2 in FIG. 1, but showing only selected portions of the rotary component and the shaft component;

FIGS. 3 and 4 are left and right side elevational views, on an enlarged scale, of portions of the rotary component and the shaft, as seen from planes that are indicated by lines 3—3 and 4—4, respectively, in FIG. 1;

FIG. 5 is an exploded perspective view, on an enlarged scale, showing portions of the rotary member, the shaft, and such connection system parts as are included in the embodiment of FIG. 1, with the view showing principally left and front side portions of the depicted components and parts;

FIG. 6 is a sectional view that is similar to FIG. 2 except that connection system parts that are used to mount the rotary component onto the shaft are not yet tightened in place (whereby the rotary component remains free to rotate relative to the shaft component, and is free to move axially along the shaft component);

FIG. 11 is an exploded perspective view, on an enlarged scale, showing portions of the rotary component, the shaft, and such connection system parts as are included in the embodiment of FIG. 6, with the view showing principally left and front side portions of the depicted components and parts;

FIG. 12 is a sectional view that is similar to FIG. 8 except that connection system parts that are used to mount the rotary component onto the shaft component are not yet tightened in place (whereby the rotary component remains free to rotate relative to the shaft component, and is free to move axially along the shaft component);

DESCRIPTION OF THE PREFERRED EMBODIMENTS

Figure 7:
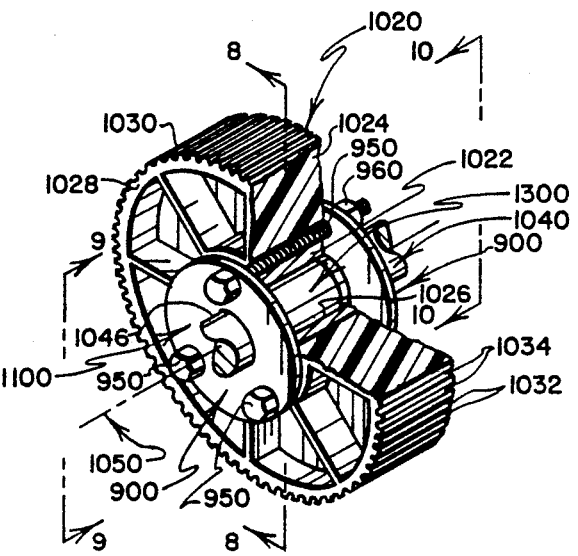
FIG. 7 is a perspective view showing portions of one side of a rotary component connected to a shaft component by employing an alternate preferred embodiment of a connection system that incorporates features of the present invention, with opposed end portions of the shaft that project away from the rotary component being broken away, and with portions of the rotary component being broken away to permit connection system parts that are deployed within a central bore of the rotary component to be seen.
Figure 9:
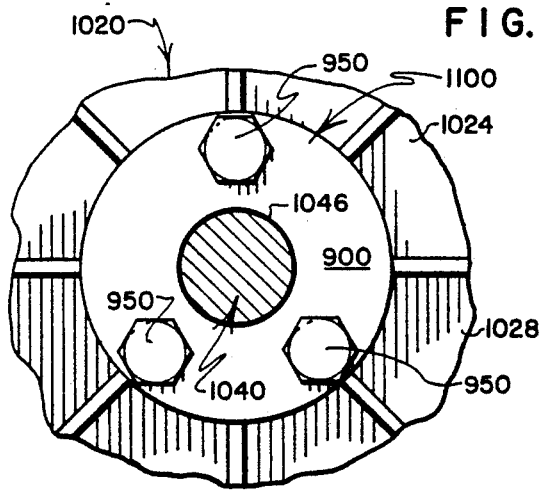
FIGS. 9 and 10 are left and right side elevational views, on an enlarged scale, of portions of the rotary component and shaft of FIG. 7, as seen from planes that are indicated by lines 9—9 and 10—10, respectively, in FIG. 7.
Figure 10:
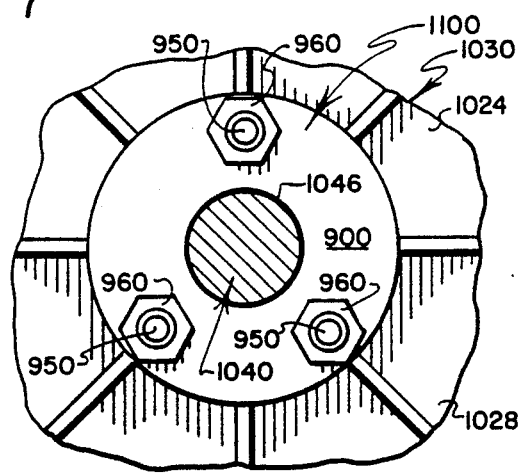
Figure 8:
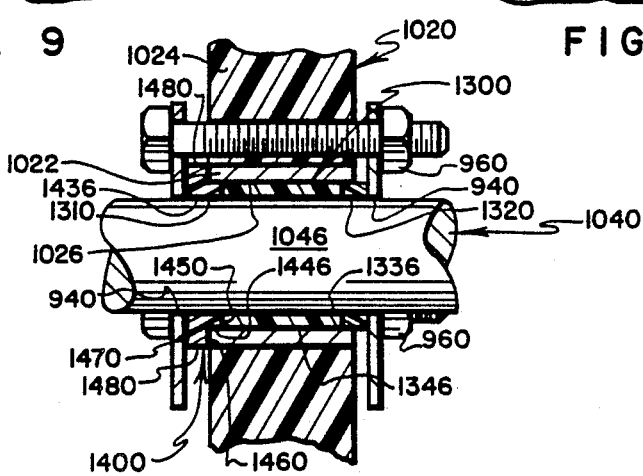
FIG. 8 is a sectional view, on an enlarged scale, as seen from a plane that is indicated by a line 8—8 in FIG. 7, but showing only selected portions of the rotary component and the shaft component.

Inasmuch as the present invention has to do with compressing an "elastomer" or a "quantity of solid-form elastomeric material" within a confined space to at least assist in forming a connection between a pair of suitably configured components, it is important to understand what is being referred to in this document by such terms as "elastomer" and "elastomeric material." Thus, the description that follows begins with a discussion of what is meant by the terms "elastomer" and "elastomeric material."

Inasmuch as a plurality of embodiments are described (and are illustrated in the drawings), after what is meant herein by the term "elastomer" is discussed, what then follows is a discussion of some of the features, including some of the similarities and differences, that are provided by the described and illustrated connection system embodiments.

The description continues with a discussion of details of the various embodiments that are illustrated in the drawings, and concludes with a summary.

1. The Terms "Elastomer" and "Elastomeric Material"

McGraw-Hill's *Dictionary of Scientific and Technical Terms*, Second Edition, defines the term "elastomer" quite simply as: "A material such as synthetic rubber or plastic, which at room temperature can be stretched under low stress to at least twice its original length and, upon immediate release of the stress, will return with force to its approximate original length."

Others, for example Van Nostrand's *Scientific Encyclopedia*, Sixth Edition, define the term "elastomer" more liberally as "a polymer possessing elastic (rubbery) properties," and then give examples as including natural or synthetic rubber, polyurethanes and other substances that "exhibit elastomeric behavior" such as silicone elastomers, fluroelastomers, ethylene-propylene elastomers, etc.

For purposes of the present document, what is intended to be included by the term "elastomer" or "elastomeric material" is a definition that is relatively liberal. It is intended that, by using herein such terms as "elastomer," "elastomeric material," "quantity of solid-form elastomeric material" and the like, what is being referred to is either a material that fits within a conventional definition of an "elastomer" (such as those that are set out above), or a "substantially equivalent material" that behaves substantially like a conventional "elastomer" in exhibiting characteristics that are relevant to the practice of the present invention, for example, such characteristics as: i) at room temperature the material has something of a "resilient" character but basically behaves as a "solid form" object that can be grasped by hand and/or manipulated by machine to effect its being assembled with other components; ii) when clampingly engaged between opposed surfaces that form part of a "confinement chamber" that is "substantially filled" by the normal solid-form configuration of the material, the material will deform slightly, if need be, to fully "fill" the "confinement chamber;" iii) when "compressed" as by causing the volume of the confinement chamber to be reduced after the material has substantially "filled" the confinement chamber, the compression of the material will cause the material to become "pressurized," much in the manner of a pressurized fluid, whereby the material will exert "pressure forces " substantially in the manner of a pressurized fluid on such surfaces as define the confinement chamber; and, iv) while compressed and pressurized, the material will not "flow" in the manner of a fluid but rather will provide distinct surfaces that engage the surfaces that define the confinement chamber, with such portions of the material as extend between the distinct surfaces tending to resist shear—whereby the material in question can be characterized as being "relatively resilient," as having a hardness that is like "medium hardness rubber," and as being "compressible," "pressurizable" and capable of serving as a "connection medium" through which forces can be transmitted between a pair of components that are "connected" as by compressing and pressurizing a quantity of the material between spaced, opposed portions of the components.

In preferred practice, an elastomeric material that is preferred for use in serving as a "connection medium" is a "medium hardness rubber" that is oil-resistant. One example of such a material is provided by what is well known to those who are skilled in the art as "nitrile rubber" that has a medium content of acrylonitrile, with the material characteristically having a hardness of about 80 durometer. An equally preferred material for forming the requisite "connection medium" is sold by E. I. DuPont de Nemours & Company of Wilmington, Del. under the registered trademark ALCRYN, with the material preferably being selected from the "ALCRYN 1000" series of melt processible synthetic rubbers as being a partially cross-linked halogenated polyolefin "alloy" that typically is supplied in pellet form, that typically has a hardness of about 80 durometer, that is resistant to oil, weather, ozone and heat-aging, and that can be "melt processed" (e.g., "extruded" or "molded") using conventional plastics processing equipment to provide sleeve-like and ring-like parts. However, as will be understood by those who are skilled in the art, any of a wide range of other suitably behaved materials can be substituted for the materials that are named above without exceeding the scope, intent and spirit of the present invention. Accordingly, such other materials as are substantially "equivalent in relevant performance characteristics" to the character of such resilient, compressible materials that are described in the present document are intended to be included when such terms as "elastomer" and "elastomeric material" are used herein.

2. Introduction to Illustrated "Preferred Embodiments"

In each of the examples that follow (i.e., examples that illustrate the "best mode" known to the inventor for carrying out "preferred embodiment" practice of the present invention), one or more sleeve-like and/or ring-like elastomeric members are disposed within "confinement chambers" that are substantially annular in configuration (i.e., each such "confinement chamber" is defined i] by a pair of generally cylindrical, coaxially-extending inner and outer diameter surfaces, and ii] by a pair of opposed, ring-like clamping surfaces that close opposed ends of the sleeve-like space that is defined between the inner and outer diameter surfaces) and that will contain the elastomeric material within the confinement chambers without permitting the elastomeric material to "extrude," "flow" or otherwise "escape" from the confinement chambers. Moreover, in each of these examples, the "sleeve-like" and/or "ring-like" elastomeric members that are disposed within the confinement chambers serve to provide what is referred to as a "quantity of solid-form elastomeric material" that is of substantially uniform radial thickness, that is of substantially uniform axially-measured length, and that "substantially fills" the associated "confinement chamber" in a "substantially uniform manner" so that, when the quantity of elastomeric material is clamped, compressed and pressurized (as by moving the opposed ring-like clamping surfaces axially toward each other), the behavior of the clamped, compressed and pressurized elastomeric material serves to facilitate the formation of a "concentric" type of connection (i.e., a connection that tends to position the inner and outer diameter surfaces that are engaged by the elastomer so that the imaginary center axes of these surfaces extend along a common center axis, typically the center axis of a shaft to which the connection couples a gear or pulley or the like).

A feature of the preferred practice of the present invention that is illustrated by the examples that follow has to do with the way in which the clamped, compressed, pressurized elastomer contributes to maintaining "connection concentricity" in that, radially inwardly and radially outwardly directed pressure forces are exerted by the elastomer on cylindrical, concentrically positioned inner and outer diameter surfaces, with this pressure being substantially uniform and serving to oppose any relative movement of the inner and outer diameter surfaces that would take these surfaces out of concentric relationship. Because the inner and outer diameter surfaces are relatively sizable in area, a further feature of the connections that are formed in the examples that follow is that the elastomeric connection media not only tend to promote connection concentricity, but also achieve this feature without causing any localized "stress concentrations" to develop. Thus, unlike connection systems that call for the use of conventional fasteners such as set screws (which tend to cause stress concentrations and tend to cause deviations from the often desired objective of providing connection concentricity), the system of the present invention can be used to prevent the formation of localized stress concentrations, and to enhance and maintain connection concentricity.

In FIGS. 1 through 6, features of a first embodiment of component connection are depicted, with the connection being formed between a commercially available type of gear or pulley and a generally cylindrical steel shaft—and with the elements that are assembled and tightened in place to provide the connection comprising a first type of "kit" of parts that incorporate features of the present invention. In FIGS. 7 through 12, features of a second embodiment of component connection are depicted, with the connection being formed between a commercially available type of gear or pulley and a generally cylindrical steel shaft—and with the elements that are assembled and tightened in place to provide the connection comprising a second type of "kit" of parts that incorporate features of the present invention. The "kits" of parts that are depicted in the embodiments of FIGS. 1-6 and 7-12 represent the "preferred" practice of the present invention in the sense that the type of connection that either of these embodiments provides typically enables a gear or a pulley to be mounted on a shaft substantially anywhere within a range of positions that extends axially along a shaft—and, in the sense that the type of connection that is provided usually can be "loosened" to permit re-positioning of the gear or pulley within the range.

Figures 13, 14:
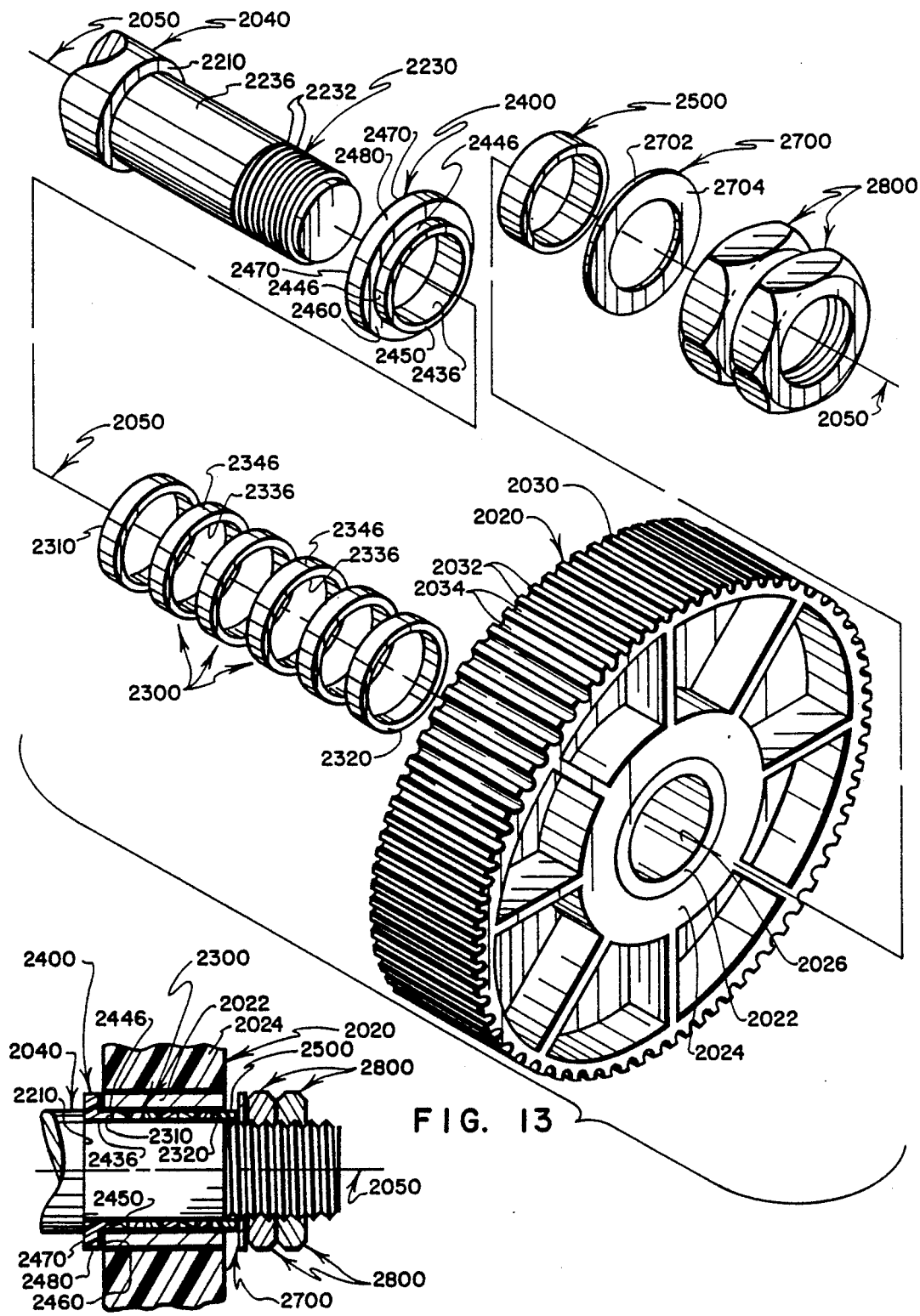
FIG. 13 is an exploded perspective view similar to the exploded views of FIGS. 5 and 11, but illustrating still another connection system embodiment that incorporates selected features of the present invention, with the view showing principally right and front side portions of the depicted components and parts.
FIG. 14 is a sectional view similar to the sectional views of FIGS. 2 and 8 except depicting, in assembly, selected portions of the components and parts of the embodiment of FIG. 13; and, FIG. 15 is an exploded perspective view showing alternate forms of connection system parts that may be utilized in each of the embodiments of FIGS. 1-6, 7-12 and 13-14.

In FIGS. 13 and 14, features of a third embodiment of component connection are depicted, with the resulting connection being caused to be located in a predetermined position that is defined by pre-formed shaft features, as will be explained. Thus, while the connection that is formed in this third embodiment can utilize connection system parts that are supplied in a "kit," the versatility and adjustability of the type of connection that is formed is not as great as results from utilizing the "kits" that are employed in the first and second embodiments of FIGS. 1-6 and 7-12, respectively.

Figure 15:
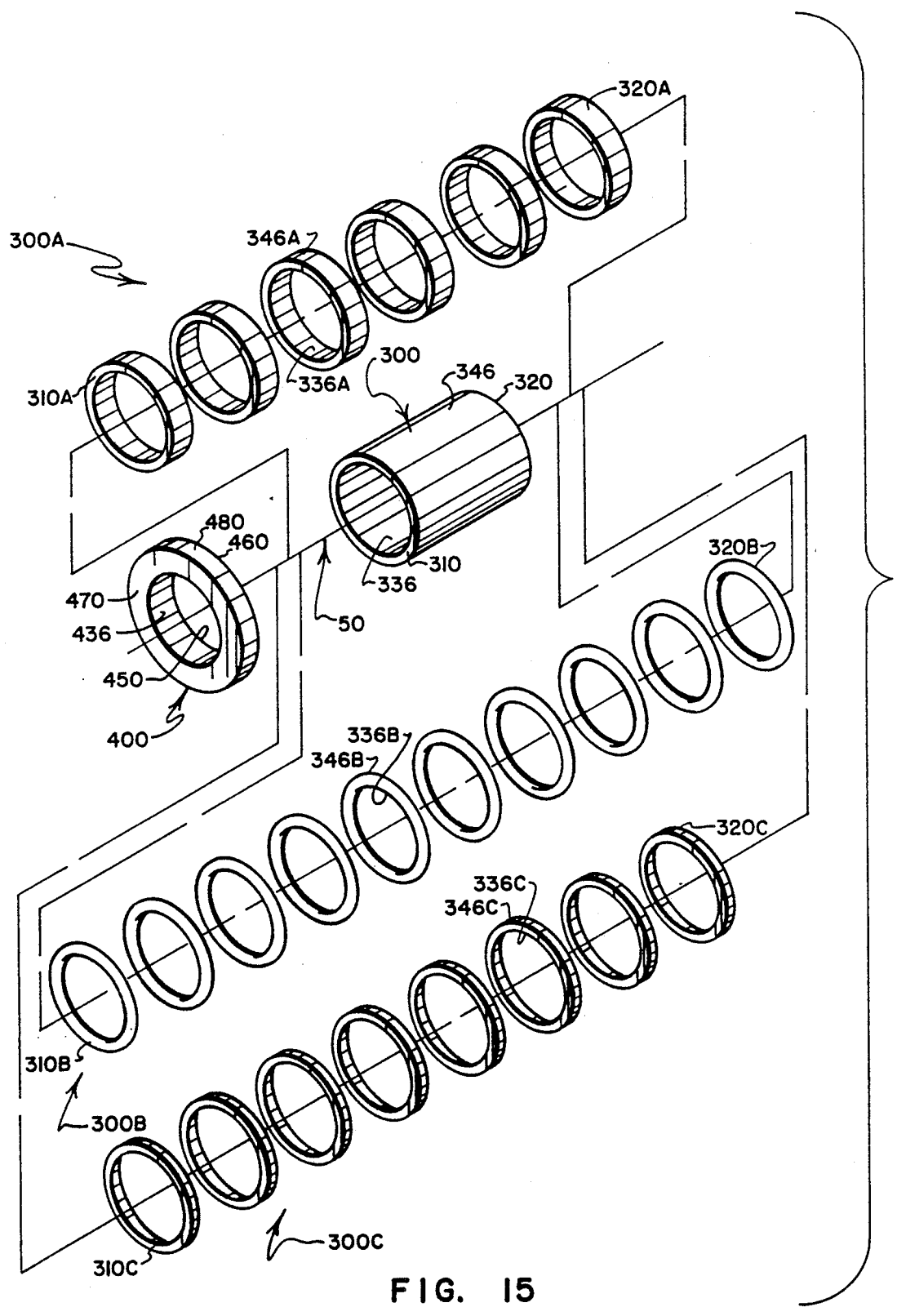

In FIG. 15, an illustration is provided of alternative "sleeve-like" and/or "ring-like" forms of elastomeric material that can be substituted in each of the embodiments of FIGS. 1-6, 7-12 and 13-14.

3. Detailed Discussion of Illustrated Embodiments

Referring to FIGS. 1-6, portions of an apertured component such as a timing belt pulley are indicated generally by the numeral 20. Portions of a component such as a shaft to which the pulley 20 is to be connected are designated generally by the numeral 40. The shaft 40 has an imaginary center axis that is indicated by the numeral 50 in FIGS. 1, 2, 5 and 6. Parts that comprise one embodiment of a connection system "kit" for mounting the pulley 20 onto the shaft portions 40, and for establishing what will be referred to as a "driving connection" between the pulley 20 and the shaft 40 are indicated generally by the numeral 100.

Because components, parts and features of the pulley-to-shaft connection system embodiment that is illustrated in the embodiment of FIGS. 1-6 have components, parts and features that "correspond" in the connection system embodiments that are illustrated in FIGS. 7-12 and 13-14, numerals that "correspond" are used to designate "corresponding" components, parts and features in these various embodiments. In the embodiment of FIGS. 7-12, components, parts and features that "correspond" to components, parts and features of the embodiment of FIGS. 1-6 differ by having the number "1000" added thereto. Likewise, in the embodiment of FIGS. 13-14, components, parts and features that correspond to components, parts and features of the embodiment of FIGS. 1-6 differ by having the number "2000" added thereto.

For example, corresponding pulley and shaft components are indicated in FIGS. 1-6, 7-12 and 13-14 by the "corresponding" numerals 20, 1020, 2020 and 40, 1040, 2040, respectively; corresponding center axes are indicated by the "corresponding" numerals 50, 1050, 2050, respectively; and, connection system parts are indicated generally by the "corresponding" numerals 100, 1100, 2100, respectively.

The pulleys that are designated by the numerals 20, 1020 and 2020 in FIGS. 1-6, 7-12 and 13-14 are "substantially identical," except that the pulley 1020 that is utilized in the connection system embodiment of FIGS. 7-12 has an array of three bolt holes 952 formed through its hub 1024 to permit "clamping bolts" 950 to extend therethrough, as will be explained in greater detail in conjunction with a discussion of features of the connection system 1100. In FIGS. 1, 5, 7 and 11, principally left and front side features of the pulleys 20, 1020 are shown; and, in FIG. 13, principally right and front side features of the pulley 2020 are depicted.

While the present invention has nothing to do with the character of the pulleys 20, 1020, 2020, for purposes of being thorough, a very brief description will be provided of the features of these pulleys. However, since the pulleys 20, 1020, 2020 are "substantially identical," specific reference will be made in the description that follows to features of the pulley 20 (it being understood that corresponding features of the pulleys 1020 and 2020 are indicated by numerals that differ from those used in FIGS. 1-6 by the numbers "1000" and "2000," respectively).

Referring to FIGS. 1-6, the pulley 20 has a metal hub portion 22 about which plastics material 24 has been molded. Referring to FIG. 5, a central bore having an inner diameter 26—a feature that also is referred to later herein by such terms as "the substantially cylindrical inner diameter surface 26" and "the inner diameter surface 26"—is formed through a central hub portion 22 of the pulley 20. The inner diameter 26 extends coaxially about the imaginary axis 50. Peripheral portions 28 of the plastics material 24 of the pulley 20 define a perimetrically extending "toothed" drive surface 30 that, in accordance with standards that have been effect for many years, is provided with raised "tooth" formations 32 that are separated by rounded-bottom valleys 34 to receive matingly configured tooth formations (not shown) that are provided on an interior surface of what is known in the art as a "timing belt" (not shown)—which is an endless "belt" that typically is reeved around peripheral portions of a plurality of such pulleys to provide a drive system that causes rotation of one of the pulleys to effect corresponding rotation of others of the timing-belt-coupled pulleys while minimizing "slippage," whereby shafts that are connected to such pulleys are caused to rotate at relative speeds that are determined by the relative diameters of the various timing-belt-connected pulleys.

As regards other features and details of construction of the pulleys 20, 1020, 2020, reference is made to the Referenced Pulley Patents which describe in detail how such pulleys preferably are made and utilized in conjunction with timing belts. However, inasmuch as the present invention has nothing whatsoever to do with the construction or features of the pulleys 20, 1020, 2020, it will be understood that the pulleys 20, 1020, 2020 are shown in the drawings and are briefly described herein because they are typical of "apertured components" such as gears, pulleys, rollers, wheels and the like that need to be connected to elongate component such as the shafts 40, 1040, 2040—i.e., as being representative of components with which the connection system embodiments of the present invention are well suited for use.

Reference is made to the exploded view of FIG. 5 wherein the individual parts that comprise the connection system kit 100 are separated one from another so that their individual features can be seen with ease. By way of overview, the connection system 100 includes a generally tubular, headed, threaded split sleeve 200 that has a longitudinally extending "split" or "slot" 250 formed in its front side; an elongate member 252 that is insertable into selected portions of the slot 250; a sleeve-like length of elastomeric material 300 for surrounding central body portions of the sleeve 200; a set of ring-like, sleeve-like and/or washer-like members 400, 500 and 700 that are installable on body portions of the sleeve 200; and, a pair of nuts 800 that are sized so as to be threaded onto threaded body portions of the sleeve 200—the features of which will be described more fully.

The split sleeve 200 has an elongate, tubular body 220 that extends from an enlarged, generally hex-shaped head formation 210 that is provided at one end region of the body 220, to an externally threaded end region 230 that is provided at the other end of the body 220. The tubular body 220 extends substantially concentrically along the center axis; has a bore that extends centrally therethrough to define an interior diameter surface 246 that extends substantially concentrically about the center axis 50; and has a central body portion 220 that defines an exterior diameter surface 236 that extends substantially concentrically about the center axis 50 from the hex-shaped head formation 210 to the externally threaded end region 230. Threads 232 are formed on the threaded end region 230 No portion of the threads 232 has a diameter that exceeds the exterior diameter 236, by which arrangement, the elastomeric sleeve 300 and the parts 400, 500 and 700 can be slided over the threads 232 and onto the exterior diameter surface 236, with such parts each having inner diameters that receive the exterior diameter surface 236 in a close slip fit.

The slot 250 extends the full length of the sleeve 200, through the tubular body 200, through the hex-shaped head 210, and through the threaded end region 230. The purpose of the slot 250 is to permit at least portions of the sleeve 200 to deform so as to narrow associated portions of the slot 250 such that at least portions of the internal diameter surface 246 will close into secure clamping engagement with the outer diameter 46 of the shaft portions 40 By this arrangement, the sleeve 200 is rigidly connected to the shaft 40 so as to provide an increase in the "effective" outer diameter of the shaft 40 (i.e., the "effective outer diameter" that is "seen" and engaged by the inner diameter of the elastomer sleeve 300), with the "effectively increased outer diameter portion of the shaft 40" (namely the exterior diameter surface 236 of the split sleeve 200 that extends between the head formation 210 and the threads 232).

The elongate member 252 has a length that enables the member 252 to be inserted into the slot 250 so as to extend substantially the full distance from the headed end of the sleeve 200 to the juncture where the threads 232 meet the exterior diameter surface 236. While the sleeve 200 is preferably formed from metal such as steel, the elongate member 252 preferably is formed either from steel wire (that has an appropriate, typically square, cross section) or from a relatively rigid plastics material (that has an appropriate, typically square or rectangular, cross section). If a square cross-sectional configuration that can be obtained by utilizing commercially available "square wire" formed from steel will not suitably serve the functions that are to be carried out by the elongate member 252 (which functions will be explained shortly), a suitable cross-sectional configuration for the elongate member 252 can easily be obtained as by utilizing conventional molding or extrusion techniques to provide a suitably configured plastics member 252.

Both the length and the cross-sectional configuration of the elongate member 252 are of importance. The length of the member 252 is of importance because, when the member 252 is positioned within portions of the slot 250 that extend from the head formation 210 to the threaded end region 230, the member 252 must not be so long as to extend into (and thus interfere with the function of) the threads 232 that are provided by the threaded end region 230. Nor should any part of the elongate member 252 extend into portions of the slot 250 that traverse the threaded end region 230, the reason being that such opposed surfaces as define the "slot space" that traverses the threaded end region 230 need to be free (i.e., the portion of the slot 250 that traverses the threaded end region 230 needs to be "substantially unobstructed") so that these opposed surfaces can move toward each other so as to effect clamping engagement with such shaft portions 40 as are surrounded by portions of the threaded end region 230. By this arrangement, when one or both of the nuts 800 are threaded onto and along the threaded end region 230, the tight fit of the threaded nuts about the threads 232 causes at least portions of the slot 250 that traverse the threaded end region to perform particularly effectively in "clamping" surrounded shaft portions 40—and, as the nuts 800 are "tightened into place" after causing the operation of the connection system 100 to be fully implemented (as will be described more fully later herein), the "clamping" action that is effected by slightly "closing" portions of the slot 250 that reside within the bounds of the threaded end region 230 will do much to establish a secure, rigid, non-slip type of driving connection between the split sleeve 200 and the shaft portions 40.

Further, the length of the member 252 is of importance in that a purpose to be served by the member 252 is to substantially "fill" the length of the slot 250 that is surrounded by the elastomer sleeve 300—so that, as portions of the sleeve 200 are "clamped" into secure engagement with the shaft 40 and/or as the elastomer sleeve 300 is "clamped" so as to diminish the axial length of a "confinement space" that is occupied by the elastomer sleeve 300 (as will be explained in greater detail), portions of the elastomer sleeve 300 do not become "pinched" within the slot 250.

The cross-sectional configuration of the member 252 is of importance in that an additional purpose to be served by the member 252 is to substantially "fill" the length of the slot 250 that is surrounded by the elastomer sleeve 300 so that the exterior diameter surface 236 and the material of the member 252 "cooperate" to provide an "effective" outer diameter of the sleeve 200 that appears "uninterrupted" and "contiguous" to the inner diameter of the elastomer sleeve 300. In essence, the elongate member 252 cooperates with such portions of the body 220 as define opposed portions of the slot 250 to "fill" central body portions of the slot 250 in a way that causes the elastomer sleeve 300 to behave as though the slot 250 does not exist—which is to say that substantially none of the elastomeric material that forms the sleeve 300 is permitted to enter the slot 250.

If the radially measured thickness of such portions of the split sleeve 200 as are surrounded by the elastomer sleeve 300 is substantially the same as the circumferentially measured width of the slot 250, it is possible in many instances to use a cut-to-length piece of commercially available "square wire" to form the elongate member 252. For example, i) if the radially measured distance between the exterior and interior diameter surfaces 236, 246 is 1/16 inch, and ii) if the slot 250 has a circumferentially measured width of 1/16 inch, commercially available 1/16 inch "square wire" cut to a suitable length typically can be used to form the member 252.

Continuing with a description of features of the elastomer sleeve 300, the sleeve 300 preferably has an inner diameter 336 that is substantially constant along the length of the sleeve 300, and an outer diameter 346 that likewise is substantially constant along the length of the sleeve 300. By this arrangement, the sleeve 300 is characterized by a substantially uniform wall thickness that extends substantially coaxially about the center axis 50. The elastomer sleeve 300 preferably has "square cut" opposed end surfaces 310, 320 that extend in spaced, parallel planes that are substantially perpendicular to the axis 50, whereby the sleeve 300 is of substantially uniform length.

The inner diameter 336 of the sleeve 200 preferably is selected to either permit the elastomer sleeve 300 to slide with ease into place on the exterior diameter surface 236 of the split sleeve 200, or to be "slided" into place with a bit of "urging" (as by "gently pushing" the sleeve 300 into place about the exterior diameter surface 236). The outer diameter 346 of the sleeve 300 preferably is selected to either permit the inner diameter surface 26 of the pulley 20 to slide with ease into place about the elastomer sleeve 300 (at a time after the sleeve 300 has been positioned to extend about the exterior diameter surface 236 of the split sleeve 200), or to be "slided" into place with a bit of "urging" (as by "gently pushing" the pulley 20 into place about the sleeve 300).

In preferred practice, the material from which the sleeve 300 is formed comprises one of the materials described earlier in this document, namely either the aforedescribed nitrile rubber, or the aforedescribed DuPont melt-processible rubber that is sold under the registered trademark ALCRYN.

In accordance with a feature of the present invention, the "quantity of solid-form elastomeric material" that forms the sleeve 30 is "hydro-elastomerically" compressed and "pressurized" so that both "fluid" and "solid" characteristics of the elastomer are brought out and used to advantage—whereby the elastomer sleeve 30 is given an ability to serve the function of providing a "connection medium" that is used in forming a secure connection between the pulley and shaft components 20, 40. More will be said about the meaning of the term "hydro-elastomeric" compression and pressurization later herein in conjunction with a discussion of the manner in which the connection system 100 is "deployed" or put into service to form a secure connection between components such as the pulley 20 and the shaft 40.

In accordance with another feature of the present invention, the performance of the connection system 100 should not be deleteriously affected (nor should it be desirably enhanced) by utilizing, instead of the single elastomer sleeve 300, a plurality of sleeve-like and/or ring-like elastomeric parts that are arranged in tandem in coaxially extending relationship so as to provide, when so arranged, a substantially sleeve-like "quantity of solid-form elastomeric material" that exhibits desired performance characteristics when "clamped, compressed and pressurized." The subject of such ring-like and/or sleeve-like elastomer parts as typically can be utilized to substitute for the single sleeve-like member 30 will be addressed before completing a discussion of features of such parts as preferably comprise the connection system 100.

Referring to FIG. 15, the single-sleeve elastomeric member 300 that is used in the connection system embodiment of FIGS. 1-6 is depicted toward the center of the view. For purposes of orientation, the ring-like member 400 is shown in FIG. 15 as being positioned slightly to the left of the elastomer sleeve 300, with the sleeve 300 and the member 400 extending coaxially about the axis 50—with this arrangement being much the same as the manner in which these same parts are depicted and oriented in the exploded view of FIG. 5.

As one alternative to using the single elastomer sleeve 30, a plurality of sleeve-like elastomeric elements (such as those that are indicated generally by the numeral 300A in FIG. 15, or those that are indicated generally by the numeral 2300 in FIG. 13) can be employed in a tandem, coaxial arrangement that, when assembled, defines substantially the same "quantity of elastomeric material" as is provided by the sleeve 30. To provide further options, a combination of sleeve-like elements of differing lengths (not shown) can be used.

As another alternative to using the single elastomer 30, a plurality of substantially ring-like members that each have a substantially square cross section (such as those that are indicated generally by the numeral 300C in FIG. 15) can be employed in a tandem, coaxial arrangement that, when assembled, defines substantially the same "quantity of elastomeric material" as is provided by the sleeve 30. To provide further options, one or more of the "square" rings 300C can be used together with or in place of one or more of the sleeve-like rings 1300, 300A, 2300 (shown in FIGS. 11, 15 and 13, respectively).

As still another alternative, a plurality of substantially round-cross-section "O-rings" (such as those that are indicated generally by the numeral 300B in FIG. 15) can be employed in side-by-side coaxially aligned relationship, with enough of these O-rings being provided to form a "quantity of elastomeric material" to enable proper clamping, compression and pressurization of the "quantity of elastomeric material" to be effected so that a desired type of connection that embodies the spirit and practice of the present invention will result.

Continuing with a discussion of the parts that, in preferred practice, comprise the clamping system 100, portions of the ring-like member 400 are shown in FIGS. 1, 2, 5 and 6; and, since the clamping rings 400, 1400 and 2400 all are "substantially identical," advantage will be taken of the fact that FIG. 13 depicts right side portions thereof to a better degree than do other views that depict portions of the clamping rings 400, 1400, 2400. The shape of left side portions of the substantially identical clamping components 400, 1400 (and hence of the substantially identical clamping component 2400) is shown in the exploded views of FIGS. 5 and 11 as being of simple, annular character. However, the shape of right side portions of the clamping component 2400 (and hence of the substantially identical clamping components 400, 1400) is shown in the exploded view of FIG. 13 as being of stepped diameter, and as defining a reduced diameter, ring-like portion 2442 that is extendable into the inner diameter 2026 of the pulley 2020, with an annular clamping surface 2450 being defined for engaging an end region 2310 of the quantity of elastomeric material 2300 that is inserted into the inner diameter 2026 of the pulley 2020. The ring portion 2442 has an inner diameter 2436 that receives an exterior diameter 2236 of a shaft portion 2040 in a close slip fit; an outer diameter 2446 that is extensible in a close slip fit into the bore 2026 of the pulley 2020; and has a radially extending shoulder 2460 that cooperates with an annular end surface 2470 to define a relatively large diameter outer ring formation 2480.

Likewise, the ring-like clamping members 400, 1400 of the embodiments of FIGS. 1-6 and 7-12 have ring-like portions 442, 1442 (see FIGS. 2, 6 and 8, 12, respectively) that extend into the inner diameters 26, 1026 of the pulleys 20, 1020, respectively, to bring annular clamping surfaces 450, 1450, respectively, into engagement with left end regions 310, 1310 of the elastomer sleeves 300, 1300, respectively. Other described features of the clamping ring 2400 are likewise duplicated in the substantially identical clamping rings 400 and 1400, with these corresponding features being designated by "corresponding numerals" correspond in the manner that is described above.

In preferred practice the ring-like clamping members 400, 1400, 2400 are formed from relatively rigid material such as fiberglass reinforced nylon—in short, a material that will maintain its size and shape, and is relatively easy and inexpensive to form.

The sleeve-like clamping members 500, 1500, 2500 are substantially identical and have inner diameters 536, 1536 and 2536, respectively; outer diameters 546, 1546, and 2546, respectively; and define annular clamping surfaces 550, 1550 and 2550 for engaging the right end regions 320, 1320, 2320 of the "quantities of elastomeric material" 300, 1300, 2300 that are employed in the connection system embodiments 100, 1100 and 2100, respectively.

In preferred practice the sleeve-like clamping members 500, 1500, 2500 are formed from relatively rigid material such as cold rolled steel tubing—in short, a material that will maintain its size and shape, and is relatively easy and inexpensive to form.

The clamping system embodiments 100 and 2100 of FIGS. 1-6 and 13-14, respectively, employ washer-like members 700, 1700 that have opposed side surfaces 702, 704 and 2702, 2704, respectively; and employ pairs of nuts 800, 2800 that are threaded onto end regions 230, 2230 of the split sleeve 200 and the shaft 2040, respectively. The washer side surfaces 702, 1702 and 704, 1704 engage the outer ends of their associated associated sleeve-like clamping members 500, 2500, and the first of the nuts 800, 2800 to be threaded onto thread formations 232, 2232 that are formed on the split sleeve 200 and on the shaft 2040, respectively. The washers 700, 2700 typically are purchased as commercially available items that is formed from mild steel and have a protective finish such as zinc plating The nuts 800, 2800 typically are purchased as commercially available hex nuts that either are formed as die cast members from zinc, or that are formed from steel.

The clamping system embodiment 1100 employs neither a split, threaded sleeve nor a reduced-diameter, threaded shaft end formation about which a sleeve-like "quantity of elastomeric material" is disposed and clamped so as to effect compression and generation of pressure forces. Rather, the clamping system embodiment 1100 that is depicted in FIGS. 7-12 employs a sleeve-like quantity of elastomeric material" 1300 that directly engages an outer diameter 1046 of a shaft 1040; and, employs a pair of annular clamping plates 900 that sandwich the pulley 1020, that have center holes 940 that receive portions of the shaft 1040, that have mounting holes 902 that align with the holes 952 that are formed through hub portions of the pulley 1020, and that utilize headed, threaded bolts 950 that extend through the aligned holes 902, 952 and that are threadingly received by lock nuts 960 so as to clamp the plates 900 toward each other in a way that will cause mounting system components 1300, 1400, 1500 to behave in clamping and compressing the elastomer 1300 in exactly the way in which the elastomer 300 is clamped and compressed in the connection system embodiment 100—except that, in the embodiment 1100, a direct connection is made between the shaft 1040 and the pulley 1020 by the elastomer 1300 without involving an intermediate member such as the split sleeve 200.

To assemble the components of the connection system 100, the split sleeve 200 typically is slided onto the shaft 40 so as to surround such portions of the shaft 40 as define a location where the pulley 20 is to be mounted. The elongate member 252 is inserted into the slot 250 of the split sleeve 200 so as to prevent the material of the elastomeric sleeve 200 from entering the slot 250, but at a location that does not interfere with the threads 232. The clamping member 400 is slided into place adjacent the head formation 210 of the split sleeve 200; the elastomeric sleeve 300 is slided into place over the central body portions 220 of the sleeve 200; and the pulley 20 is slided into position such that its inner diameter 24 slides over the outer diameter of the elastomeric sleeve 300. The sleeve-like and washer-like clamping members 500, 700 are slided into position on the sleeve 200, and the nuts 800 are threaded onto the threaded end region 230 of the split sleeve 200.

With the split sleeve 200 properly positioned to assure proper final positioning of the pulley 20; with the ring-like compression member 400 engaging the enlarged head 210 of the split sleeve 200; and, with hub portions of the pulley 20 engaging the radially extending shoulder 460 of the ring-like compression member 400, the nuts 800 are tightened (actually the nut 800 that is nearest to the pulley 20 is tightened first to effect both a clamping engagement of the sleeve 200 with the shaft 40, and to cause the elastomeric sleeve 300 to be compressed between the clamping surfaces 450, 550—and, once the first-to-be-tightened one of the nuts 800 has caused the desired type of connection to be formed between the shaft 40 and the pulley 20, the remaining nut 800 is tightened into place (i.e., into engagement with the first-tightened nut to lock both of the nuts 800 in place on the sleeve 200).

During the tightening of the nuts 800, the threaded end region 230 of the split sleeve 200 is clamped by the nuts 800 so as to bring the split sleeve 200 into secure clamping engagement with the shaft portions 40; and, as the first-to-be-tightened nut 800 engages the washer-like member 700 so as to cause the clamping surfaces 450, 550 of the clamping members 400, 500 to axially compress the elastomer sleeve 300, the ring-like clamping surfaces 450, 550 cooperate with the inner and exterior diameter surfaces 26, 236 to define what is referred to as a "confinement chamber" therebetween—within which the "quantity of elastomeric material" 30 is confined.

The "fit" of the clamping ring surfaces 450, 550 within the concentric surfaces 26, 236 is adequately snug to assure that the material of the elastomer 30 is not able to extrude or otherwise escape from the previously described "confinement chamber; and, as the "clamping" (i.e., the axial movement of the clamping surfaces 450, 550 toward each other) progresses, the "quantity of elastomeric material" tends to undergo a two-stage type of reaction. First, the elastomeric material 30 tends to "deform" to the extent needed to assure that the confinement chamber is substantially "filled" (i.e., "compression" and "pressurization" do not play a major role in effecting this simple "manipulation" or "positioning" of the elastomer so as to assure that the elastomer properly "fills" the confinement chamber; rather, simple resilient movement of portions of the elastomer is usually all that is called for in order to assure that any vacant areas of the confinement chamber are duly occupied by portions of the elastomer).

However, once the elastomer 300 has been positioned so that it duly fills the volume of the confinement chamber, further relative clamping movement of the clamping ring surfaces 450, 550 toward each other will naturally cause the volume of the confinement chamber (and hence the volume that is occupied by the elastomer) to diminish, whereby the material that comprises the elastomer will be "compressed" and "pressure" forces will tend to develop as the elastomer comes to behave much like a fluid—at least in the sense that the compressed, pressurized elastomer is caused to exert substantially equal force per unit of surface area on such surfaces as define the a confinement chamber, regardless the the orientation of these surfaces.

Stated in another way, because elastomeric components such as sleeves or rings formed from rubber, synthetic rubber, resilient plastic materials and the like behave somewhat uniquely when subjected to controlled conditions of compression, it is possible to make use of "elastomeric" characteristics of these components in ways that "normal" solid objects can not be utilized. For example, if an annular space that is defined between the outer diameter of a shaft and the inner diameter of the bore of a pulley or gear is substantially "filled" with by one or more sleeve-like and or ring-like members formed from elastomeric material, and if the elastomeric material is compressed axially as by applying force to the elastomer at opposed ends of the bore, as the compression force builds, the elastomeric material "deforms" slightly (i.e., as may be needed to completely "fill" the space in which it is confined); and, as the compression force increases still more, the quantity of confined elastomer begins to behave increasingly like a viscous "fluid" as opposed to a "solid" in that, like a fluid, it becomes "pressurized" and begins to exert forces that are substantially uniform per unit of area on the surfaces that confine the elastomer (i.e., the compressed elastomer exerts "reaction" force not only in axial directions on such elements as are causing the elastomer to be "axially compressed," but also radially outwardly and radially inwardly on such surfaces areas as serve to confine the elastomer. Thus, compressive force that is imposed in one direction on a confined elastomer causes the elastomer to behave as a compressed fluid would do in transmitting pressure forces to all surrounding surfaces, with the magnitude of the force per unit of surrounding surface area being substantially uniform and not varying to any significant extent as a function of the direction of orientation of any particular confining surface portion.

In the preferred practice of the present invention, the "elastomer" or "elastomeric material" that is selected for use in establishing a connection between a pair of "otherwise relatively movable" components (i.e., components that interfit or interengage "relatively loosely so as to be "relatively movable" in the absence of some "connection medium" forming a connection therebetween) has the characteristic of being able to "frictionally grip" component surfaces against which it is forcefully pressed (as opposed to having the characteristic of providing an oiled-like interface when being pressed against such component surfaces, whereby the formation of a "secure connection" at the interface is rendered difficult). However, because some degree of "lubricity" tends to exist between certain elastomers (that otherwise are quite capable of providing needed connection characteristics) and selected rigid component-forming materials, there are some instances in which the use of conventional "connection-enhancing measures" is desirable—measures such as roughening such component surfaces, or portions thereof, as are engaged by the elastomer (typically as by sand blasting or by using some other conventional surface-roughening technique), and/or by deploying an adhesive material at one or more of the interface portions where the elastomer makes forceful contact with one or more of the components that the elastomer is to assist in connecting).

To assemble the components of the connection system 1100, one of the clamping plates 900 is positioned on the shaft 1040 at substantially the location where the pulley 1020 is to be mounted. The clamping member 1400 is slided into place adjacent the positioned clamping plate 900; the elastomeric sleeve 1300 is slided into place over the outer diameter surface 1046 of the shaft 1040, with the left end 1310 being brought into engagement with the clamping ring surface 1450; the pulley 1020 is slided into position such that its inner diameter 1024 slides over the outer diameter 1346 of the elastomer sleeve 1300. The sleeve-like clamping member 1500 is slided into position along the shaft 1040 so that its ring-like clamping surface 1550 is brought into engagement with the right end 1320 of the elastomer sleeve 1300; the other of the clamping plates 900 is positioned on the shaft in engagement with the sleeve-like clamping member 1500; the bolts 950 are inserted through aligned holes 952, 902; and the nuts 960 are threaded onto the bolts 950 and are tightened in place to effect clamping, compression and pressurization of the elastomer sleeve 1300 (as has been described previously) so as to directly connect the shaft 1040 with the pulley 1020.

To assemble the components of the connection system 2100, the clamping member 2400 is slided into place adjacent the radially extending shoulder 2210 of the shaft 2040; the plurality of elastomer sleeve components 2300 are slided into place over the central body portions 2236 of the reduced diameter end region of the shaft 2040 to provide a "sleeve-like quantity of solid-form elastomeric material" (that, in the environment of the present invention will behave in all essential ways as though it is made up of a single sleeve-like member), with the first-to-be-installed of the sleeve like members being moved to a location where its left end region 2310 engages the ring-like clamping surface 2450 of the clamping member 2400; the pulley 2020 is slided into position such that its inner diameter 2024 slides over the outer diameter 2346 that is provided by the tandem, coaxial arrangement of sleeve-like components 2300; the sleeve-like and washer-like clamping members 500, 700 are slided into position on the shaft 2040 so that the ring-like clamping surface 2550 engages the right end 2320 of the last-to-be-installed one of the sleeve-like components 2300; and the nuts 2800 are threaded onto the threaded end region 2230 of the shaft 2040 to effect clamping, compression and pressurization of the sleeve-like quantity of solid-form elastomer 2300 so as to directly connect the shaft 2040 with the pulley 2020.

While three different forms of the preferred practice of the present invention have been described and illustrated herein, it will be understood by those who are skilled in the art that principles and features of the present invention are not limited to use with precisely these types of connection systems. By way of but one example, while all of the mounting system embodiments 100, 1100, 2100 that are described and illustrated herein tend to provide substantially "concentric" connections (i.e., connections wherein central axes of the pulleys 20, 1020, 2020 are positioned to extend substantially concentrically along the central axes of the shafts 40, 1040, 2040 on which the pulleys 20, 1020, 2020 are mounted), it readily will be understood by those who are skilled in the art that the spirit and scope of features of the connection system of the present invention are not limited in their use or applicability to the formations of connections that are concentric in nature.

While it is the tendency of the system of the present invention to provide somewhat resilient (i.e., somewhat "cushioned") connections between components—connections that often are useful to assure smooth running of parts, to absorb shock, to absorb vibration, and/or to abate noise—the resilient character of the connections that are provided can be varied in ways that have been discussed previously; and, if desired, the extent to which relative movement is permitted between connected components can be controlled, minimized or even substantially eliminated. By way of but one example, the sizes of the center holes 940 that are formed in the clamping plates 900 of the embodiment of FIGS. 7-12 can be selected so as to very severely limit relative radial movement between the pulley 1020 and the shaft 1040 while, at the same time, a "relatively soft," a "relatively medium hardness," or a "relatively hard" elastomer 1300 can be chosen for use in forming the "connection medium" whereby relative angular movement between the pulley 1020 and the shaft 1040 can be permitted to a desired extent, restricted as may be desired, or even substantially prohibited.

As will be apparent to those who are skilled in the art from a careful review of the foregoing discussion taken together with the accompanying drawings and the several claims that follow, the connection system of the present invention is of a highly versatile character and takes the very unusual approach of providing connections between or among components that typically loosely interfit and/or interengage. Connections are provided by positioning elastomeric material in intervening spaces that exist between or among components, and by subjecting the elastomeric material to "hydroelastomeric compression" within such spaces so as to bring out and utilize to advantage both "fluidic" and "solid-form" characteristics of the elastomeric material. Such an approach truly "flies in the face" of traditional teaching, and represents a clear contribution to the art and science of forming connections between components.

Furthermore, the connection system of the present invention has many features that can be selectively deployed in wide variety of novel and improved modes to achieve specific objectives—so that connections of many types can be provided between and among components of mechanisms and machines that are, in ways not previously thought to be possible, "tailored" to meet specific needs of specific applications.

Among the features of the present invention is the capability that is provided for utilizing relatively inexpensively formed components to establish easily assembled, easily disassembled, easily adjusted, and easily serviced types of driving connections between or among components that otherwise are relatively movable and typically loosely interfit or interengage. A further feature resides in the capability that is provided by the connection system of the present invention to form secure connections utilizing simple kits of mounting system parts that can be assembled, disassembled, serviced and/or replaced "on site" with ease and in a minimum of time so as to connect such components as gears and pulleys to shafts at substantially any desired positions along the lengths of the shafts.

A further feature of the present invention resides in the utilization of compressed elastomeric components to provide connections between relatively rigid "components, with the forces that are applied to the rigid components to effect such connections tending to be well distributed over relatively sizable surface areas, whereby stress concentrations tend to be avoided.

While pulley-to-shaft types of connections are described herein for purposes of providing examples of the use of the system of the present invention, it will be apparent to those who are skilled in the art, the approach that is utilized by the present invention to provide secure connections between components is not limited in its application to the provision of a simple yet reliable means for mounting pulleys and gears onto shafts. In this respect, the present case sets the stage for other related developments that are expected to be addressed in later-filed cases.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A method of establishing a connection between a first component and a second component, comprising the steps of:
    a) providing a first component with a hole that extends through a selected part of the first component, with the hole defining a first component hole portion (i) that is of generally cylindrical configuration, (ii) that has opposed first and second end regions, and (iii) that has a substantially constant inner diameter surface that extends substantially coaxially about an imaginary first axis for substantially the full distance between the opposed first and second end regions;
    b) providing a second component with an elongate formation, with the elongate formation defining a second component shaft-like portion that is of generally cylindrical configuration and has a substantially constant outer diameter surface that extends substantially coaxially about an imaginary second axis for substantially the full length of the second component shaft-like portion, with said outer diameter surface being sufficiently smaller in diameter than is the diameter of said inner diameter surface so that, when the outer diameter surface is received substantially coaxially within the inner diameter surface, there is a sleeve-like annular space of substantially uniform thickness that separates the inner diameter surface of the first component from the outer diameter surface of the second component, with the annular space having opposed first and second end regions that are located relatively near to the first and second opposed end regions, respectively, of the first component hole portion;
    c) positioning the first and second components (i) such that the first and second imaginary axes align so as to extend coaxially along an imaginary center axis, and (ii) such that the outer diameter surface is received substantially coaxially within the inner diameter surface so that said sleeve-like annular space of substantially uniform thickness is defined between the inner and outer diameter surfaces, with the annular space extending substantially coaxially about the imaginary center axis between the opposed first and second end regions of the annular space;
    d) providing within the annular space a quantity of solid-form elastomeric material extending circumferentially about the outer diameter surface so as to occupy a substantially sleeve-like annular volume that extends axially from (i) a first end region thereof that is located relatively near the first end region of the annular space, and (ii) a second end region thereof that is located relatively near the second end region of the annular space;
    e) providing confinement means for engaging, confining and compressing the quantity of elastomeric material within the annular space, with the confinement means including first and second structures that are movable along the center axis relatively toward and away from each other, with the first and second structures defining first and second clamping ring formations, respectively, (i) that are configured to extend into the first and second end regions of the annular space, respectively, when the first and second structures are moved along the center axis relatively toward each other, (ii) that are configured, to define opposed clamping surfaces that engage and clamp the first and second opposed end regions, respectively, of the elastomeric material when the first and second structures are moved relatively axially toward each other, and (iii) that are configured to cooperate with the inner and outer diameter surfaces to confine the elastomeric material to a "confinement chamber" which is a sleeve-like annular region that is bounded (i) at opposed ends by said opposed clamping surfaces, and (ii) at inner and outer diameters by the inner and outer diameter surfaces of the first and second components, respectively, whereby the confinement chamber defines a volume that is controllable as by moving the first and second clamping ring formations relatively toward and away from each other so as to selectively control the axial spacing between the opposed clamping surfaces; and, f) operating the confinement means to diminish the volume of the confinement chamber so as to clamp and compress the quantity of elastomeric material within the confinement chamber, with the operating of the confinement means being effected by moving the first and second structures relatively toward each other to move the first and second clamping ring formations, relatively toward each other within the annular space (i) to bring the opposed clamping surfaces into engagement with the opposed first and second end regions of the elastomeric material, (ii) to diminish the volume of the confinement chamber by causing the opposed clamping surfaces to clampingly engage the quantity of elastomeric material therebetween such that the elastomeric material is caused to deform to such extent as may be needed to enable the quantity of elastomeric material to substantially fill the volume of the confinement chamber, and (iii) to diminish still further the volume of the confinement chamber by bringing the opposed clamping surfaces into progressively more forceful clamping engagement with the quantity of elastomeric material so as to cause the quantity of elastomeric material to behave much like a compressed fluid in the sense that the quantity of elastomeric material is caused to become "pressurized" within the confinement chamber such that the pressurized quantity of elastomeric material is caused to exert pressure forces (1) not only in substantially axial directions so as to oppose with increasing forcefulness continued axial clamping movement of the opposed clamping surfaces, (ii) but also in radially inwardly and radially outwardly extending directions so as to bring the elastomeric material into forceful engagement with the inner and outer diameter surfaces of the first and second components, respectively, with the radially directed pressure forces serving to assist in establishing frictional connections at interfaces between the elastomeric material and the inner and outer diameter surfaces of the first and second components, respectively;

g) whereby a connection is formed between the first and second components.

2. A connection between components that is formed in accordance with the method of claim 1.

3. The method of claim 1 wherein the step of providing a quantity of solid-form elastomeric material, and the step of providing confinement means includes the step of providing a kit of connection-forming parts that comprises means for defining said quantity of solid-form elastomeric material, and means for defining said confinement means.

4. A kit of connection-forming parts as defined in claim 3.

5. The method of claim 1 wherein the step of providing a quantity of solid-form elastomeric material includes the step of providing at least one sleeve-like elastomeric member that provides at least a portion of said quantity of solid-form elastomeric material.

6. A connection between components that is formed in accordance with the method of claim 5.

7. The method of claim 5 wherein the step of providing a quantity of solid-form elastomeric material, the step of providing said at least one sleeve-like elastomeric member, and the step of providing confinement means includes the step of providing a kit of connection-forming parts that comprises means for defining said quantity of solid-form elastomeric material including said at least one sleeve-like elastomeric member, and means for defining said confinement means.

8. A kit of connection-forming parts as defined in claim 7.

9. The method of claim 1 wherein the step of providing a quantity of solid-form elastomeric material includes the step of providing at least one ring-like elastomeric member that provides at least a portion of said quantity of solid-form elastomeric material.

10. A connection between components that is formed in accordance with the method of claim 9.

11. The method of claim 9 wherein the step of providing a quantity of solid-form elastomeric material, the step of providing said at least one ring-like elastomeric member, and the step of providing confinement means includes the step of providing a kit of connection-forming parts that comprises means for defining said quantity of solid-form elastomeric material including said at least one ring-like elastomeric member, and means for defining said confinement means.

12. A kit of connection-forming parts as defined in claim 11.

13. The method of claim 9 wherein the step of providing at least one ring-like elastomeric member includes the step of providing at least one ring-like elastomeric member that is formed from an endless circular ring of elastomeric material that defines a shape that is annular about an imaginary axis, and that has a substantially uniform cross-sectional configuration when viewed in all planes that extend radially relative to said axis.

14. A connection between components that is formed in accordance with the method of claim 13.

15. The method of claim 13 wherein the step of providing a quantity of solid-form elastomeric material, the step of providing said at least one ring-like elastomeric member that is formed from an endless circular ring of elastomeric material, and the step of providing confinement means includes the step of providing a kit of connection-forming parts that comprises means for defining said quantity of solid-form elastomeric material including said at least one ring-like elastomeric member, and means for defining said confinement means.

16. A kit of connection-forming parts as defined in claim 15.

17. The method of claim 13 wherein the step of providing at least one ring-like elastomeric member includes the step of providing the at least one ring-like elastomeric member such that said cross-sectional configuration is substantially circular.

18. A connection between components that is formed in accordance with the method of claim 17.

19. The method of claim 17 wherein the step of providing a quantity of solid-form elastomeric material, the step of providing said at least one ring-like elastomeric member, and the step of providing confinement means includes the step of providing a kit of connection-forming parts that comprises means for defining said quantity of solid-form elastomeric material including said at least one ring-like elastomeric member, and means for defining said confinement means.

20. A kit of connection-forming parts as defined in claim 19.

21. The method of claim 13 wherein the step of providing at least one ring-like elastomeric member includes the step of providing the at least one ring-like elastomeric member such that said cross-sectional configuration is substantially square.

22. A connection between components that is formed in accordance with the method of claim 21.

23. The method of claim 21 wherein the step of providing a quantity of solid-form elastomeric material, the step of providing said at least one ring-like elastomeric member, and the step of providing confinement means includes the step of providing a kit of connection-forming parts that comprises means for defining said quantity of solid-form elastomeric material including said at least one ring-like elastomeric member, and means for defining said confinement means.

24. A kit of connection-forming parts as defined in claim 23.

25. The method of claim 13 wherein the step of providing at least one ring-like elastomeric member includes the step of providing the at least one ring-like elastomeric member such that said cross-sectional configuration is substantially rectangular.

26. A connection between components that is formed in accordance with the method of claim 25.

27. The method of claim 25 wherein the step of providing a quantity of solid-form elastomeric material, the step of providing said at least one ring-like elastomeric member, and the step of providing confinement means includes the step of providing a kit of connection-forming parts that comprises means for defining said quantity of solid-form elastomeric material including said at least one ring-like elastomeric member, and means for defining said confinement means.

28. A kit of connection-forming parts as defined in claim 27.

29. The method of claim 1 wherein the step of providing a quantity of solid-form elastomeric material includes the step of providing a plurality of sleeve-like elastomeric members that are configured to be arranged coaxially to provide said quantity of solid-form elastomeric material 30. A connection between components that is formed in accordance with the method of claim 29.

31. The method of claim 29 wherein the step of providing a quantity of solid-form elastomeric material, the step of providing a plurality of sleeve-like elastomeric member, and the step of providing confinement means includes the step of providing a kit of connection-forming parts that comprises means for defining said quantity of solid-form elastomeric material including said at least one sleeve-like elastomeric member, and means for defining said confinement means.

32. A kit of connection-forming parts as defined in claim 31.

33. The method of claim 1 wherein the step of providing a quantity of solid-form elastomeric material includes the step of providing a plurality of ring-like elastomeric members are configured to be arranged coaxially to provide said quantity of solid-form elastomeric material.

34. A connection between components that is formed in accordance with the method of claim 33.

35. The method of claim 33 wherein the step of providing a quantity of solid-form elastomeric material, the step of providing a plurality of ring-like elastomeric member, and the step of providing confinement means includes the step of providing a kit of connection-forming parts that comprises means for defining said quantity of solid-form elastomeric material including said at least one sleeve-like elastomeric member, and means for defining said confinement means.

36. A kit of connection-forming parts as defined in claim 35.

37. The method of claim 1 wherein the step of providing a quantity of solid-form elastomeric material includes the steps of (i) providing at least one ring-like elastomeric member, (ii) providing at least one sleeve-like elastomeric member, and (iii) combining said ring-like and said sleeve-like elastomeric members to provide said quantity of solid-form elastomeric material.

38. A connection between components that is formed in accordance with the method of claim 37.

39. The method of claim 37 wherein the step of providing a quantity of solid-form elastomeric material, the step of providing confinement means includes the step of providing a kit of connection-forming parts that comprises means for defining said quantity of solid-form elastomeric material, and means for defining said confinement means, with said quantity of solid-form elastomeric material including at least one ring-like elastomeric member and at least one sleeve-like elastomeric member.

40. A kit of connection-forming parts as defined in claim 39.

41. The method of claim 1 wherein the step of providing a quantity of solid-form elastomeric material includes the step of selecting the elastomer from which said solid-form elastomeric material is formed so as to provide connection between the first and second components that exhibits characteristics that are desirable in conjunction with a predetermined use that is to be made of the elastomer-connected first and second components.

42. A connection between components that is formed in accordance with the method of claim 41.

43. The method of claim 41 wherein the step of providing a quantity of solid-form elastomeric material, the step of providing confinement means includes the step of providing a kit of connection-forming parts that comprises means for defining said quantity of solid-form elastomeric material, and means for defining said confinement means, with said step of selecting the elastomer including the step of providing the kit with means for defining said quantity of solid-form elastomeric material including at least one part that is formed from an elastomer that will facilitate the forming of a connection between the first and second components that exhibits characteristics that are desirable in conjunction with a predetermined use that is to be made of the elastomer-connected first and second components.

44. A kit of connection-forming parts as defined in claim 43.

45. The method of claim 41 wherein the step of selecting the elastomer includes the step of selecting a relatively rigid elastomer from which to form said quantity of solid-form elastomeric material so that the resulting connection that is formed between the first and second components will be of a relatively rigid character.

46. A connection between components that is formed in accordance with the method of claim 45.

47. The method of claim 45 wherein the step of providing a quantity of solid-form elastomeric material, the step of providing confinement means includes the step of providing a kit of connection-forming parts that comprises means for defining said quantity of solid-form elastomeric material, and means for defining said confinement means, with said step of selecting the elastomer including the step of selecting a relatively rigid elastomer from which to form said quantity of solid-form elastomeric material.

48. A kit of connection-forming parts as defined in claim 47.

49. The method of claim 41 wherein the step of selecting the elastomer includes the step of selecting a relatively soft elastomer from which to form said quantity of solid-form elastomeric material so that the resulting connection that is formed between the first and second components will be of a relatively soft and cushioned character.

50. A connection between components that is formed in accordance with the method of claim 49.

51. The method of claim 49 wherein the step of providing a quantity of solid-form elastomeric material, the step of providing confinement means includes the step of providing a kit of connection-forming parts that comprises means for defining said quantity of solid-form elastomeric material, and means for defining said confinement means, with said step of selecting the elastomer including the step of selecting a relatively soft elastomer from which to form said quantity of solid-form elastomeric material.

52. A kit of connection-forming parts as defined in claim 51.

53. The method of claim 41 wherein the step of selecting the elastomer includes the step of selecting a relatively hard elastomer that tends to resist relative movement of its integrally formed portions from which to form said quantity of solid-form elastomeric material so that the resulting connection that is formed between the first and second components will permit relatively little relative movement between the first and second components.

54. A connection between components that is formed in accordance with the method of claim 53.

55. The method of claim 53 wherein the step of providing a quantity of solid-form elastomeric material, the step of providing confinement means includes the step of providing a kit of connection-forming parts that comprises means for defining said quantity of solid-form elastomeric material, and means for defining said confinement means, with said step of selecting the elastomer including the step of selecting a relatively hard elastomer that tends to resist relative movement of its integrally formed portions.

56. A kit of connection-forming parts as defined in claim 55.

57. The method of claim 41 wherein the step of selecting the elastomer includes the step of selecting a relatively medium hardness, internal-movement-permissive elastomer from which to form said quantity of solid-form elastomeric material so that the resulting connection that is formed between the first and second components will permit a limited amount of relatively movement to take place between the first and second components.

58. A connection between components that is formed in accordance with the method of claim 57.

59. The method of claim 57 wherein the step of providing a quantity of solid-form elastomeric material, the step of providing confinement means includes the step of providing a kit of connection-forming parts that comprises means for defining said quantity of solid-form elastomer material, and means for defining said confinement means, with said step of selecting the elastomer including the step of selecting a relatively medium hardness elastomer that tends to permit limited relative movement of its integrally formed portions.

60. A kit of connection-forming parts as defined in claim 59.

61. The method of claim 1 wherein the step of establishing frictional connections at interfaces between the elastomeric material and the inner and outer diameter surfaces of the first and second components, respectively, includes the step of applying an adhesive to at least a selected one of said interfaces to assist in preventing relative movement of the elastomeric material and the associated one of the first and second components at said selected interface.

62. A connection between components that is formed in accordance with the method of claim 61.

63. The method of claim 61 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the kit further includes a quantity of adhesive means for application to at least a selected one of said interfaces.

64. A kit of connection-forming parts as defined in claim 63.

65. The method of claim 1 wherein the step of establishing frictional connections at interfaces between the elastomeric material and the inner and outer diameter surfaces of the first and second components, respectively, includes the step of roughening at least portions of at least a selected one of the inner and outer diameter surfaces to assist in preventing relative movement of the elastomeric material and the associated one of the first and second components at the associated interface.

66. A connection between components that is formed in accordance with the method of claim 65.

67. The method of claim 65 wherein the step of providing a quantity of solid-form elastomeric material, and the step of providing confinement means includes the step of providing a kit of connection-forming parts that comprises means for defining said quantity of solid-form elastomeric material, and means for roughening at least selected portions of at least a selected one of the inner and outer diameter surfaces.

68. A kit of connection-forming parts as defined in claim 67.

69. The method of claim 1 wherein the step of operating the confinement means includes the step of moving the opposed clamping surfaces relatively toward each other to the extent that the quantity of elastomeric material is caused to be pressurized to a predetermined extent that will assist in providing a connection between the first and second components that exhibits desired connection characteristics.

70. A connection between components that is formed in accordance with the method of claim 69.

71. The method of claim 69 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the step of operating the confinement means includes the step of including said confinement means within the kit of connection-forming parts.

72. A kit of connection-forming parts as defined in claim 71.

73. The method of claim 1 additionally including the step of providing travel limiting means for at least partially restricting the range of relative movement that can take place between the first and second components once said connection has been provided therebetween.

74. A connection between components that is formed in accordance with the method of claim 73.

75. The method of claim 74 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the step of providing travel limiting means for at least partially restricting the range of relative movement that can take place between the first and second components includes the step of including said travel limiting means within the kit of connection-forming parts.

76. A kit of connection-forming parts as defined in claim 75.

77. The method of claim 73 wherein the step of providing travel limiting means includes the step of providing structure that is rigidly connected to a selected one of the first and second components, and that extends toward the other of the first and second components so as to restrict the relative movement that is permitted between the first and second components once said connection has been provided therebetween.

78. A connection between components that is formed in accordance with the method of claim 77.

79. The method of claim 77 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the step of providing structure that is rigidly connected to a selected one of the first and second components, and that extends toward the other of the first and second components so as to restrict the relative movement that is permitted between the first and second components includes the step of including said travel limiting structure within the kit of connection-forming parts.

80. A kit of connection-forming parts as defined in claim 79.

81. The method of claim 1 wherein the step of operating the confinement means includes the steps of providing retaining means for maintaining a desired extent of clamping and pressurization of said quantity of elastomeric material, and of utilizing the retaining means once a desired extent of clamping and pressurization of said quantity of elastomeric material has been attained.

82. A connection between components that is formed in accordance with the method of claim 81.

83. The method of claim 81 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the step of providing retaining means includes the step of including said retaining means within the kit of connection-forming parts.

84. A kit of connection-forming parts as defined in claim 83.

85. The method of claim 81 wherein (i) the step of providing retaining means includes the step of providing threaded fastening means that is operable not only to effect said desired extent of clamping and pressurization but also to maintain said desired extent of clamping and pressurization, and wherein (ii) the step of utilizing the retaining means includes the step of retaining the threaded fastening means in place once it has been utilized to effect said desired extent of clamping and pressurization.

86. A connection between components that is formed in accordance with the method of claim 85.

87. The method of claim 85 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the step of providing threaded fastening means includes the step of including said threaded fastening means within the kit of connection-forming parts.

88. A kit of connection-forming parts as defined in claim 87.

89. The method of claim 85 wherein (i) the step of providing threaded fastening means includes the steps of providing at least one externally threaded member, of providing at least one internally threaded nut that can be threaded onto said at least one externally threaded member; wherein (ii) the step of effecting the desired extent of clamping and pressurization is carried out, at least in part, by threading said at least one nut onto said at least one threaded member; and wherein (iii) the step of utilizing retaining means includes the step of locking said at least one internally threaded nut in place on said at least one externally threaded member.

90. A connection between components that is formed in accordance with the method of claim 89.

91. The method of claim 89 wherein the step of providing a quantity of solid-form elastomeric material, and the step of providing confinement means includes the step of providing a kit of connection-forming parts that comprises means for defining said quantity of solid-form elastomeric material, and means for defining said confinement means, and wherein the steps of providing at least one externally threaded member, of providing at least one internally threaded nut include the step of including said at least one externally threaded member and said internally threaded nut within the kit of connection-forming parts.

92. A kit of connection-forming parts as defined in claim 91.

93. The method of claim 1 wherein:
a) the steps of providing said first and second components include:
i) providing an apertured part such as a gear or a pulley that has a centrally extending bore, with the apertured part providing the first component, and with the bore that extends through the apertured part defining the first component hole portion;

ii) providing an elongate member such as a shaft or a rod that has a selected region onto which the first component is to be mounted, with the selected region providing the second component, and with the selected region defining the second component shaft-like portion; and, b) the remainder of the steps that are recited in claim 1 include:

i) providing a kit of pre-fabricated parts that define the solid-form elastomeric material and the confinement means, and that can be assembled so as to extend about the selected region and through the bore so as to be clamped into place so as to clamp and compress the quantity of solid-form elastomeric material; and, ii) assembling and clamping selected parts from said kit so as to carry out the provision, clamping, compression and pressurization of the elastomeric material to form a connection between the first and second components.

94. A connection between components that is formed in accordance with the method of claim 93.

95. The method of claim 1 wherein the recited steps include:

a) providing an apertured part such as a gear or a pulley that has a centrally extending bore, with the apertured part providing the first component, and with the bore that extends through the apertured part defining the first component hole portion;

b) providing an elongate member such as a shaft or a rod that has a selected region onto which the first component is to be mounted;

c) providing a kit of pre-fabricated parts for effecting a connection between the first component and the selected region of the elongate member, with the kit including a split sleeve part providing the second component in that the split sleeve part has both an exterior diameter that defines said outer diameter and an internal configuration that is configured to fit snugly about and to be clamped into secure engagement with the selected region, and with the kit including other parts that define the solid-form elastomeric material and the confinement means, which parts can be assembled so as to extend about the selected region and through the bore so as to be clamped into place so as to clamp and compress the quantity of solid-form elastomeric material; and, d) assembling and clamping selected parts from said kit so as to carry out the provision, clamping, compression and pressurization of the elastomeric material to form a connection between the first and second components.

96. A connection between components that is formed in accordance with the method of claim 95.

97. The method of claim 1 wherein the step of providing a quantity of elastomeric material, and the step of providing said confinement means are effected as by providing a kit of pre-formed parts, with the kit of parts including at least one annular elastomeric member for defining said quantity of solid-form elastomeric material, and including at least a pair of substantially annular members for defining said first and second structures.

98. A connection between components that is formed in accordance with the method of claim 97.

99. The method of claim 97 wherein the step of providing a kit of pre-formed parts includes the step of providing the kit with a plurality of annular-shaped elastomeric members that are configured to be arranged coaxially to provide said quantity of solid-form elastomeric material.

100. A connection between components that is formed in accordance with the method of claim 99.

101. The method of claim 1 wherein:

a) the step of providing said second component includes the steps of:

i) providing an elongate member that has an exterior surface formation of a character that can reside loosely within an imaginary cylindrical hole that has a diameter that is equal to said outer diameter of said second component;

ii) supplementing the exterior surface formation of the elongate member as by positioning a sleeve-like member in closely spaced relationship about said exterior surface formation, with the sleeve-like member having a perimeter surface that defines said second component shaft-like portion; and, b) the step of operating the confinement means to cause the elastomeric material to become "pressurized" within the confinement chamber is carried out in such a way as to also cause the sleeve-like member to be clamped into secure engagement with the exterior surface formation of the elongate member.

102. A connection between components that is formed in accordance with the method of claim 101.

103. The method of claim 101 wherein:

a) the step of positioning a sleeve-like member includes the steps of:

i) providing the sleeve-like member with a longitudinally extending slot that essentially "splits" one side portion of the sleeve-like member so that opposed parts of the split side portion can be moved relatively together so as to narrow at least a portion of the slot, and to thereby cause the sleeve-like member to be clamped into secure engagement with the exterior surface formation of the elongate member;

ii) providing a portion of the sleeve-like member with external threads that bridge said slot and that are capable of threadedly receiving an internally threaded nut thereon;

iii) providing at least one internally threaded nut that is theadable onto said external threads, and that is operative, when threaded thereon, to cause at least portions of the sleeve-like member to move relatively together a portion of the slot; and, to narrow at least a portion of the slot; and, b) the step of operating the confinement means includes the step of threading said at least one internally threaded nut onto said external threads to cause the sleeve-like to be clamped into secure engagement with the exterior surface formation of the elongate member.

104. A connection between components that is formed in accordance with the method of claim 103.

105. The method of claim 103 wherein the step of providing the sleeve-like member with a longitudinally extending slot additionally includes the steps of providing elongate means including an elongate member that is insertable into such portions of the slot as underlie the quantity of elastomeric material, with the elongate member having a cross-sectional configuration that serves to substantially fill such slot portions so that the outer diameter surface portions that are surrounded by the quantity of elastomeric material function as though that they are substantially uninterrupted and contiguous, just as though no slot were formed through such the sleeve-like member, whereby the step of compressing and pressurizing the quantity of elastomeric material is effected substantially without any portions of the elastomeric material being caused to enter any portions of the slot.

106. A method of connecting first and second components including the steps of:
   a) providing an aperture that extends through a first component;
   b) providing an elongate formation on the second component;
   c) positioning the elongate formation to extend through the aperture that is formed in the first component, but with the elongate formation being loosely received within the aperture;
   d) providing a quantity of elastomeric material to surround the elongate formation where it is received within the aperture; and,
   e) compressing and pressurizing the elastomeric material so as to cause pressure forces to be developed that force the elastomeric material into snug engagement with surrounding and surrounded surface portions of the first and second components, respectively, to provide a connection between the first and second components.

107. A connection between components that is formed in accordance with the method of claim 106.

108. A kit of parts that is capable of being assembled to form a connection between a first component and a second component, wherein the first component is of the type that defines an aperture that has an inner surface that extends therethrough; wherein the second component is of the type that has a formation that defines a perimetrically extending outer surface that is insertable into the aperture of the first component so as to fit relatively loosely therein; and, wherein the kit of parts comprises:
   a) elastomer means for defining a quantity of elastomeric material that defines an interior surface for extending in a band-like manner about the outer surface of the second component, and that defines an exterior surface for extending in a band-like manner within close proximity to the inner surface of the first component, and with the band-like quantity of elastomeric material also defining first and second edge surfaces that are connected by the interior and exterior surfaces, whereby the band-like quantity of elastomeric material is operative to facilitate positioning of the inner and outer surfaces of the first and second components in spaced relationship with the inner surface being surrounded by the outer surface, with the elastomeric material extending in a space that is defined between the inner and outer surfaces, and with the first and second edge surfaces being positioned near first and second opposed end regions of said space;
   b) engagement means for extending into the first and second opposed end regions of said space for engaging the first and second opposed edge surfaces of the band-like quantity of elastomeric material is positioned between the first and second components as is described in "a)" above, and with the engagement means defining first and second opposed clamping surfaces that are configured to engage said first and second opposed edge surfaces, respectively, with the first and second clamping surfaces being movable relatively toward each other to effect clamping engagement with the endless band, and with the first and second opposed edge surfaces being configured to cooperate with the inner and outer surfaces to define a "confinement chamber" within which the band-like quantity of elastomeric material is contained; and,
   c) clamping means for moving the first and second clamping surfaces relatively toward each other to clampingly engage, compress and pressurize the quantity of elastomeric material so that the quantity of elastomeric material is caused to exert pressure forces on the first and second components and to thereby facilitate the formation of a connection between the first and second components.

109. A connection between first and second components that is formed as by utilizing a kit of parts as is described in claim 108.

110. A method of forming a connection between first and second components including the steps of providing and utilizing a kit of parts as is described in claim 108.

* * * * *